US012395796B2

(12) United States Patent
Li et al.

(10) Patent No.: US 12,395,796 B2
(45) **Date of Patent: *Aug. 19, 2025**

(54) LOUDSPEAKER APPARATUS

(71) Applicant: SHENZHEN SHOKZ CO., LTD., Guangdong (CN)

(72) Inventors: Chaowu Li, Shenzhen (CN); Yongjian Li, Shenzhen (CN); Yueqiang Wang, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/642,762

(22) Filed: Apr. 22, 2024

(65) Prior Publication Data

US 2024/0276154 A1 Aug. 15, 2024

Related U.S. Application Data

(63) Continuation of application No. 17/646,483, filed on Dec. 30, 2021, now Pat. No. 12,108,234, which is a (Continued)

(30) Foreign Application Priority Data

Jan. 5, 2019 (CN) ......................... 201910009874.6

(51) Int. Cl.
*H04R 1/10* (2006.01)
*H04R 9/02* (2006.01)
(Continued)

(52) U.S. Cl.
CPC ............ *H04R 9/06* (2013.01); *H04R 1/1008* (2013.01); *H04R 1/1025* (2013.01); *H04R 1/105* (2013.01);
(Continued)

(58) Field of Classification Search
CPC .. H04R 1/1008; H04R 1/1025; H04R 1/1041; H04R 1/105; H04R 1/1058;
(Continued)

(56) References Cited

U.S. PATENT DOCUMENTS 2,586,644 A 2/1952 Gilbert
2,930,856 A 3/1960 Toht
(Continued)

FOREIGN PATENT DOCUMENTS

CN 202679589 U 1/2013
CN 204598270 U 8/2015
(Continued)

OTHER PUBLICATIONS

International Search Report in PCT/CN2019/102410 mailed on Nov. 21, 2019, 8 pages.
(Continued)

*Primary Examiner* — Huyen D Le
(74) *Attorney, Agent, or Firm* — METIS IP LLC

(57) ABSTRACT

A loudspeaker apparatus includes a circuit housing configured to accommodate a circuit component or a battery; an ear hook; a housing of an earphone core configured to accommodate the earphone core; and a housing protector at least partially covering a periphery of the circuit housing and the ear hook. A first end of the ear hook is connected to the circuit housing. The earphone core is driven by the circuit component or the battery to vibrate to generate sound. The housing of the earphone core is connected to a second end of the ear hook away from the circuit housing through a hinge component. The hinge component is capable of rotating to change a position of the housing of the earphone core relative to the ear hook.

20 Claims, 29 Drawing Sheets

Related U.S. Application Data continuation of application No. 17/098,342, filed on Nov. 14, 2020, now Pat. No. 11,272,292, which is a continuation of application No. PCT/CN2019/102410, filed on Aug. 24, 2019.

(51) Int. Cl.
*H04R 9/06* (2006.01)
*H04R 25/00* (2006.01)

(52) U.S. Cl.
CPC ............ *H04R 1/1091* (2013.01); *H04R 9/02* (2013.01); *H04R 9/025* (2013.01); *H04R 25/65* (2013.01); *H04R 25/658* (2013.01); *H04R 2225/021* (2013.01); *H04R 2400/11* (2013.01); *H04R 2460/13* (2013.01)

(58) Field of Classification Search
CPC ...... H04R 1/1075; H04R 1/1091; H04R 9/02; H04R 9/025; H04R 9/06; H04R 25/65; H04R 25/658; H04R 2225/021; H04R 2400/11; H04R 2460/13
See application file for complete search history.

(56) References Cited

U.S. PATENT DOCUMENTS

| | | | | |
|---|---|---|---|---|
| 3,906,170 | A | 9/1975 | Guice | |
| 4,727,582 | A | 2/1988 | De Vries et al. | |
| 4,917,504 | A | 4/1990 | Scott et al. | |
| 5,761,298 | A | 6/1998 | Davis et al. | |
| 5,960,094 | A | 9/1999 | Jensen et al. | |
| 8,180,083 | B2 | 5/2012 | Campbell et al. | |
| 8,718,306 | B2 * | 5/2014 | Gommel | H04R 1/1066 381/322 |
| 11,159,877 | B2 * | 10/2021 | Li | H04R 1/1041 |
| 11,166,094 | B2 | 11/2021 | Li et al. | |
| 11,272,292 | B2 * | 3/2022 | Li | H04R 1/1008 |
| 11,818,533 | B2 | 11/2023 | Li et al. | |
| 11,943,577 | B2 | 3/2024 | Li et al. | |
| 2004/0235364 | A1 | 11/2004 | Matsumoto et al. | |
| 2007/0014423 | A1 | 1/2007 | Darbut et al. | |
| 2008/0119078 | A1 | 5/2008 | Arai | |
| 2009/0288911 | A1 | 11/2009 | Chen et al. | |
| 2011/0019850 | A1 * | 1/2011 | Ooi | H04R 25/60 381/330 |
| 2015/0063607 | A1 | 3/2015 | Li et al. | |
| 2015/0163607 | A1 | 6/2015 | Harte et al. | |
| 2015/0201291 | A1 | 7/2015 | Harris | |
| 2016/0134957 | A1 | 5/2016 | Jentz et al. | |
| 2016/0277837 | A1 | 9/2016 | Sato et al. | |
| 2017/0111728 | A1 | 4/2017 | Kim et al. | |
| 2021/0329376 | A1 | 10/2021 | Li et al. | |
| 2024/0179446 | A1 | 5/2024 | Li et al. | |

FOREIGN PATENT DOCUMENTS

| | | | |
|---|---|---|---|
| CN | 204669606 | U | 9/2015 |
| CN | 206380059 | U | 8/2017 |
| CN | 107124682 | A | 9/2017 |
| CN | 107484054 | A | 12/2017 |
| CN | 207039852 | U | 2/2018 |
| CN | 108391213 | A | 8/2018 |
| CN | 109547905 | A | 3/2019 |
| CN | 209089198 | U | 7/2019 |
| WO | 2012140921 | A1 | 10/2012 |

OTHER PUBLICATIONS

Written Opinion in PCT/CN2019/102410 mailed on Nov. 21, 2019, 9 pages.

* cited by examiner

LOUDSPEAKER APPARATUS

CROSS-REFERENCE TO RELATED APPLICATIONS

This application is a continuation of U.S. application Ser. No. 17/646,483, filed on Dec. 30, 2021, which is a continuation of U.S. application Ser. No. 17/098,342 (issued as U.S. Pat. No. 11,272,292), filed on Nov. 14, 2020, which is a continuation of International Application No. PCT/CN2019/102410, filed on Aug. 24, 2019, which claims priority of Chinese application No. 201910009874.6, filed on Jan. 5, 2019, the contents of each of which are incorporated herein in its entirety by reference.

TECHNICAL FIELD

The present disclosure relates to a loudspeaker apparatus, and particularly to a loudspeaker apparatus with waterproof function.

BACKGROUND

In general, people can hear sound because air transmits vibrations to eardrums through ear canals of external ears, and vibrations formed by the eardrums drive human auditory nerve to perceive sound. At present, earphones are widely used in people's life. For example, users may use earphones to play music and answer calls. Earphones have become an important item in people's daily life. However, ordinary headphones cannot meet user's normal use in some special scenes (for example, swimming, outdoor rainy days, etc.) any more. At present, headphones with waterproof function and capable of adjusting positions to fit human body are more popular with consumers. Therefore, it is necessary to provide a loudspeaker apparatus with a waterproof function and capable of adjusting positions for fitting the human body.

SUMMARY

An aspect of the present disclosure provides a loudspeaker apparatus. The loudspeaker apparatus may include: a circuit housing, configured to accommodate a circuit component or a battery; an ear hook, wherein a first end of the ear hook is connected to the circuit housing; a housing of an earphone core, configured to accommodate the earphone core, wherein the earphone core is driven by the circuit component or the battery to vibrate to generate sound, the housing of the earphone core is connected to a second end of the ear hook away from the circuit housing through a hinge component, and the hinge component is capable of rotating to change a position of the housing of the earphone core relative to the ear hook so that the housing of the earphone core fits in front of or behind an ear of a user; and a housing protector, wherein the housing protector at least partially covers a periphery of the circuit housing and the ear hook, and the housing protector is made of a waterproof material.

In some embodiments, the housing protector may include a bag-like structure with an open end, so that the circuit housing enters an interior of the housing protector through the open end of the housing protector.

In some embodiments, the open end of the housing protector may be disposed with an annular flange protruding inward, and when the housing protector covers the periphery of the circuit housing, the annular flange may abut an end of the circuit housing away from the ear hook.

In some embodiments, a sealant may be applied to a joint region of the annular flange and the end of the circuit housing away from the ear hook to seal the housing protector and the circuit housing.

In some embodiments, the end of the circuit housing away from the ear hook may include a first annular table surface, and the first annular table surface is snap-connected to the annular flange to position the housing protector.

In some embodiments, the first annular table surface may be disposed with a positioning block extending in a direction away from the ear hook, and the annular flange of the housing protector is disposed with a positioning slot corresponding to the positioning block; wherein the positioning slot is configured to accommodate at least a portion of the positioning block to position the housing protector.

In some embodiments, the circuit housing may include two sub-housings fastened to each other, and the housing protector completely covers a joint seam of the two sub-housings.

In some embodiments, a joint surface of the two sub-housings that are fastened to each other may include a stepped structure that fits into each other.

In some embodiments, the circuit housing may be disposed with a plurality of mounting holes, and an outer surface of the circuit housing may be disposed with a first gum slot; wherein the plurality of mounting holes are located in the first gum slot;

and the loudspeaker apparatus further includes conductive pillars respectively inserted into the plurality of mounting holes, and the housing protector further includes an exposure hole that allows the conductive pillars to be exposed; wherein a sealant is applied in the first gum slot to seal the housing protector and the circuit housing at a periphery of the plurality of mounting holes.

In some embodiments, the loudspeaker apparatus may further include an auxiliary plate, wherein the auxiliary plate includes a plate body, and the plate body is disposed with a hollowed-out area; wherein the plate body is disposed on an inner surface of the circuit housing, the plurality of mounting holes are located inside the hollow-out area, and a second gum slot is formed on a periphery of the conductive pillar; wherein a sealant is applied in the second gum slot to seal the plurality of mounting holes inside the circuit housing.

In some embodiments, the housing of the earphone core may be disposed with a socket hole; wherein the ear hook includes an elastic metal wire and a plug end disposed at one end of the elastic metal wire, wherein the plug end is plugged into the socket hole.

In some embodiments, a stop block may be disposed on an inner sidewall of the socket hole; and the plug end may include: an insertion portion that is at least partially inserted into the socket hole and abuts on an outer surface of the stop block; two elastic hooks that are disposed on a side of the insertion portion facing an interior of the housing of the earphone core, wherein the two elastic hooks are capable of being close to each other under an action of an external thrust and the stop block and being elastically restored to be stuck on an inside surface of the stop block after passing through the stop block, thereby achieving the fixing of the housing of the earphone core and the plug end.

In some embodiments, the insertion portion may be partially inserted into the socket hole, and an exposed portion of the insertion portion may be set as a stair-step shape, thereby forming a second annular table surface spaced from an outer end surface of the housing of the earphone core; and the ear hook further includes a protective sleeve disposed on a periphery of the elastic metal wire and the plug end; wherein the protective sleeve further extends to a side of the second annular table surface facing the outer end surface of the housing of the earphone core, and elastically abuts the housing of the earphone core when the housing of the earphone core is fixed with the plug end.

In some embodiments, the protective sleeve may form an annular abutting surface on a side of the second annular table surface facing the outer end surface of the housing of the earphone core, and an annular boss located inside the annular abutting surface and protruding from the annular abutting surface; and the housing of the earphone core may include an inclined surface for connecting the outer end surface of the housing of the earphone core and the inner sidewall of the socket hole; wherein when the housing of the earphone core is fixedly connected to the plug end, the annular abutting surface and the annular boss abut elastically the outer end surface of the housing of the earphone core and the inclined surface, respectively.

In some embodiments, the hinge component may include a hinge, a rod-like component, and a fixing component; the hinge comprising: a hinge base; and a hinge arm, wherein the hinge arm is rotatably connected to the hinge base through a rotation shaft, and when an external force is applied to the hinge arm, the hinge arm is capable of rotating relative to the hinge base to change a position of a loudspeaker component relative to the ear hook.

In some embodiments, an inner surface of the housing of the earphone core may be disposed with a first recessed area, and the housing of the earphone core may be disposed with a keyhole located in the first recessed area and used to connect the inner surface and an outer surface of the housing of the earphone core.

In some embodiments, the loudspeaker apparatus may further include: an elastic bearing seat, the elastic bearing seat including an integrally formed bearing body and a support pillar; wherein the bearing body is disposed in the first recessed area and fixed to a bottom of the first recessed area, and the support pillar is disposed on a side of the bearing body facing an outside of the housing of the earphone core and is exposed from the keyhole; and a key disposed on the exposed part of the support pillar.

In some embodiments, the bearing body may include an annular fixing portion disposed around the key hole and fixed to the bottom of the first recessed area, and an elastic support portion connected to an inner ring surface of the annular fixing portion and protruding in a dome shape toward the outside of the housing of the earphone core; wherein the support pillar is disposed on a top of the elastic support portion.

In some embodiments, the outer surface of the housing of the earphone core may be disposed with a second recessed area; wherein the key hole is further located in the second recessed area, and the key is at least partially sunk in the second recessed area.

In some embodiments, the key may include a key body and a first annular flange and a second annular flange disposed on one side of the key body; wherein the first annular flange is located at a middle region of the key body, and the second annular flange is located at an outer edge of the key body; wherein the support pillar is inserted inside the first annular flange, and an end surface of the second annular flange away from the key body is sunk in the second recessed area and is spaced a certain distance from a bottom of the second recessed area when the elastic bearing seat is in a normal state.

In some embodiments, the elastic bearing seat may further include a contact head disposed on a side of the bearing body near the inside of the housing of the earphone core and configured to contact a switch of the key.

In some embodiments, the housing of the earphone core may include a main housing and a clapboard component; wherein the clapboard component is located inside the main housing and is connected to the main housing, thereby dividing an internal space of the main housing into a first accommodation space and a second accommodation space; and the housing of the earphone core is further disposed with a socket hole connecting the outer end surface of the housing of the earphone core.

In some embodiments, the second accommodation space may be near the socket hole.

In some embodiments, the main housing may include a peripheral sidewall and a bottom sidewall connected to one end surface of the peripheral sidewall.

In some embodiments, the clapboard component may include a side clapboard whose two ends are connected to the peripheral sidewall, and a bottom clapboard which is spaced from the bottom sidewall and connected to the peripheral sidewall and the side clapboard, respectively; wherein the bottom clapboard is disposed with a trace hole, and the side clapboard is disposed with a trace slot at a top edge away from the bottom sidewall.

In some embodiments, the circuit housing may include: an accommodation body disposed with a cavity having at least one opening; and a cover body disposed on the at least one opening and configured to seal the cavity; wherein the cover body includes a hard support and a soft cover layer integrally injection-molded on a surface of the hard support, the support is used for physically connection with the accommodation body, and the cover layer is used to seal the cavity after the support is connected with the accommodation body.

In some embodiments, a shape of a side of the support facing the accommodation body may be matched with the opening so that the support is fastened to the opening, and the cover layer covers an outer surface of the support away from the accommodation body.

In some embodiments, the support may include an insertion portion and a covering portion; wherein the covering portion covers the opening, and the insertion portion is disposed on one side of the covering portion and extends into the cavity along an inner wall of the cavity to fix the covering portion on the opening.

In some embodiments, the accommodation body may include an opening edge for defining the opening, and the covering portion may be pressed on an inner region of the opening edge near the opening; wherein the cover layer covers an outer surface of the covering portion away from the accommodation body and is pressed on an outer region of a periphery of the inner region of the opening edge so as to achieve the seal between the cover layer and the opening edge.

In some embodiments, in a fastened state, a contact end surface of the covering portion and the opening edge and a contact end surface of the cover layer and the opening edge are flush with each other; or the cover layer further extends between the covering portion and the opening edge and the covering portion is pressed on the inner region of the opening edge.

In some embodiments, the cavity of the accommodation body may be disposed with a circuit component, and the circuit component may be disposed with a switch; wherein the support is disposed with a switch hole corresponding to the switch, the cover layer covers the switch hole, and a pressing portion is disposed at a position corresponding to the switch hole; wherein the pressing portion extends toward an inside of the cavity through the switch hole, and when the corresponding position of the cover layer is pressed, the pressing portion presses the switch on the circuit component, thereby triggering the circuit component to execute a preset function.

BRIEF DESCRIPTION OF THE DRAWINGS

The present disclosure is further described in terms of exemplary embodiments. These exemplary embodiments are described in detail combining the drawings. These examples are not limiting, in these examples, the same number indicates the same structure, where.

DETAILED DESCRIPTION

Figure 1:
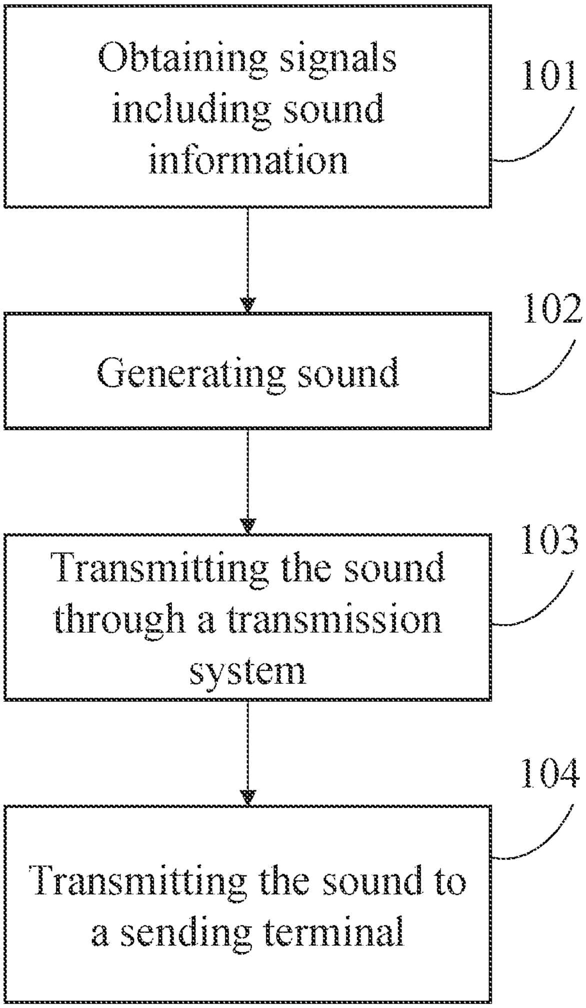
FIG. 1 is a flowchart illustrating an exemplary process for generating sound in human ears by a loudspeaker apparatus according to some embodiments of the present disclosure.

In order to illustrate the technical solutions related to the embodiments of the present disclosure, brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings. It should be understood that the purposes of these illustrated embodiments are only provided to those skilled in the art to practice the application, and not intended to limit the scope of the present disclosure. Unless obviously obtained from the context or the context illustrates otherwise, the same numeral in the drawings refers to the same structure or operation.

As used in the disclosure and the appended claims, the singular forms "a," "an," and "the" include plural referents unless the content clearly dictates otherwise. In general, the terms "comprise" and "include" merely prompt to include steps and elements that have been clearly identified, and these steps and elements do not constitute an exclusive listing. The methods or devices may also include other steps or elements. The term "based on" is "based at least in part on." The term "one embodiment" means "at least one embodiment"; the term "another embodiment" means "at least one other embodiment". Related definitions of other terms will be given in the description below. In the following, without loss of generality, in describing sound conduction related technologies in the present disclosure, descriptions of "player", "loudspeaker apparatus", "speaker apparatus", or "loudspeaker" will be used. This description is just one form of sound conduction application. For those of ordinary skill in the art, "player", "playing apparatus", "loudspeaker apparatus", "speaking apparatus" or "hearing aid" may also be replaced by other similar words. In fact, the various implementations in the present disclosure may be easily applied to other non-loudspeaker hearing devices. For example, for professionals in the field, after understanding the basic principles of loudspeaker apparatus, they may make various modifications and changes in the form and details of the specific ways and steps of implementing the loudspeaker apparatus without departing from this principle. In particular, the ambient sound pickup and processing function is added to the loudspeaker apparatus, so that the loudspeaker apparatus implements the function of a hearing aid. For example, in the case of bone conduction loudspeaker apparatus, a microphone such as a microphone that can pick up the sound of the user/wearer's surroundings is added, and the processed sound (or generated electrical signal) is transmitted to the bone conduction loudspeaker apparatus under a certain algorithm. The bone conduction loudspeaker apparatus may be modified to include a function of picking up ambient sounds, and after a certain signal processing, the sound is transmitted to the user/wearer through the bone conduction loudspeaker apparatus, thereby realizing a bone conductive hearing aid. As an example, the algorithm herein may include a noise cancellation algorithm, an automatic gain control algorithm, an acoustic feedback suppression algorithm, a wide dynamic range compression algorithm, an active environment recognition algorithm, an active noise reduction algorithm, a directional processing algorithm, a tinnitus processing algorithm, a multi-channel wide dynamic range compression algorithm, an active howling suppression algorithm, a volume control algorithm, or the like, or any combination thereof.

FIG. 1 is a flowchart illustrating an exemplary process for generating sound in human ears by a loudspeaker apparatus according to some embodiments of the present disclosure. The loudspeaker apparatus may use its built-in loudspeaker to transmit sound to a hearing system of a human through bone conduction or air conduction, thereby the human may hear a sound. As shown in FIG. 1, the process for generating sound in the human ear by the loudspeaker apparatus may mainly include the following steps:

In step 101, the loudspeaker apparatus may obtain or generate signals including sound information. In some embodiments, the sound information may include a video file or an audio file having a specific data format, data or files that may be eventually converted into sound in a specific way, or the like, or any combination thereof. In some embodiments, the signals including the sound information may be obtained from a storage unit of the loudspeaker apparatus, or may be obtained from an information generation system, a storage, or a transmission system other than the loudspeaker apparatus. The signals herein may be not limited to electrical signals. For example, the signals may include other forms, such as optical signals, magnetic signals, mechanical signals, or the like, or any combination thereof. In principle, as long as the signals includes information that the loudspeaker apparatus may be used to generate sound, the signals may be considered as sound signals. In some embodiments, the sound signals may be not obtained from a single signal source, but from a plurality of signal sources. The signal sources may be related to each other or may not be related to each other. In some embodiments, the means of transmitting or generating the sound signals may be a wired connection or a wireless connect, real-time or time-delayed. For example, the loudspeaker apparatus may receive electric signals including the sound information through wired or wireless means, and may also directly obtain data from a storage medium to generate the sound signals. Taking a bone conduction loudspeaker as an example, a component with a sound collection function may be added into the bone conduction loudspeaker. By picking up sound in the environment, the component with the sound collection function may convert mechanical vibrations of the sound into electrical signals. The electrical signals may be processed by an amplifier to obtain electrical signals that meet specific requirements. The wired connection may include a metal cable, an optical cable, or a metal and optical hybrid cable, or the like, or any combination thereof. For example, the wired connection may include a coaxial cable, a communication cable, a flexible cable, a spiral cable, a non-metallic sheathed cable, a metal sheathed cable, a multi-core cable, a twisted pair cable, a ribbon cable, a shielded cable, a telecommunication cable, a twisted pair cable, a parallel twisted pair conductor, a twisted pair, or the like, or any combination thereof. The examples described above are only for illustration purposes, medium of the wired connection may also include other types, such as other electrical or optical signal transmission carriers.

A storage device/storage unit herein may be a storage on a storage system. For example, the storage device/storage unit may include a Direct Attached Storage, a Network Attached Storage, a Storage Area Network, or the like, or any combination thereof. The storage device/storage unit may include a solid-state storage device (e.g., a solid state disk, a hybrid hard disk, etc.), a mechanical hard disk, a USB flash memory, a memory stick, a memory card (e.g., a CF card, a SD card, etc.), other drivers (e.g., CD, DVD, HD DVD, Blu-ray, etc.), a random access memory (RAM), a read-only memory (ROM), or the like, or any combination thereof. The RAM may include a dekatron, a selectron, a delay line memory, Williams tubes, a dynamic random access memory (DRAM), a static random access memory (SRAM), a thyristor random access memory (T-RAM), a zero capacitor random access memory (Z-RAM), or the like, or any combination thereof. The ROM may include a bubble memory, a twistor memory, a film memory, a plated wire memory, a magnetic-core memory, a drum memory, a CD-ROM, hard disks, tapes, a non-volatile random access memory (NVRAM), a phase-change memory, a magneto-resistive random access memory, a ferroelectric random access memory, a non-volatile SRAM, a flash memory, an electrically erasable programmable read-only memory, an erasable programmable read-only memory, a programmable read-only memory, a mask ROM, a floating gate random access memory, a Nano random access memory, a racetrack memory, a resistive random access memory, a programmable metallization unit, or the like, or any combination thereof. The storage device/storage unit described above is only for illustration purposes.

In step 102, the loudspeaker apparatus may convert the signals including the sound information into vibrations and generate sound. The vibrations may be generated by energy conversion. For example, the loudspeaker apparatus may use a specific transduction apparatus to convert the signals into mechanical vibrations. The conversion process may include a coexistence and conversions of a plurality of different types of energies. For example, electrical signals may be directly converted into mechanical vibrations through a transduction apparatus. The transduction apparatus may generate sound. As another example, the sound information may be included in optical signals. A specific transduction apparatus may convert the optical signals into vibration signals. Other types of coexisted and converted energies may include thermal energy, magnetic field energy, or the like, or any combination thereof. In some embodiments, the energy conversion means of the energy conversion apparatus may include a moving coil type, an electrostatic type, a piezoelectric type, a moving iron type, a pneumatic type, an electromagnetic type, or the like, or any combination thereof. A frequency response range and sound quality of the loudspeaker apparatus may be affected by the different energy conversion means and performances of physical components of the transduction apparatus. For example, in a dynamic coil type of transduction apparatus, a wound cylindrical coil may be connected to a vibration plate, and the wound cylindrical coil driven by a signal current may drive the vibration plate to generate sound in a magnetic field. A stretching and shrinking, a deformation of folds, a size, shape and a fixing way of a material of the vibration plate, and a magnetic density of a permanent magnet, etc., may have a great impact on the sound quality of the loudspeaker apparatus.

The term "sound quality" used herein may be understood to reflect a quality of sound that a sound device generates. The term "sound quality" may refer to a fidelity of an audio after being processed and transmitted. In a sound device, the sound quality usually may include several aspects. For example, the sound quality may include an intensity and an amplitude of an audio, a frequency of the audio, an overtone or harmonic components of the audio, or the like, or any combination thereof. When assessing the sound quality of the audio device, there are not only measurement and evaluation criteria for objectively evaluating the sound quality, but also algorithms for evaluating attributes of the sound quality by combining different elements of the sound and subjective feelings. Therefore, the generation, transmission and reception of the sound may affect the sound quality of the sound.

In step 103, the sound may be transmitted through a transmission system. In some embodiments, the transmission system may refer to a substance that may transmit the vibration signals including the sound information. For example, the transmission system may include skulls, bone labyrinths, inner ear lymph fluid, and spiral organs of humans and/or animals that have hearing systems. As another example, the transmission system may include a medium that may transmit sound. For example, the medium may include air, liquid, or the like, or any combination thereof. For illustration purposes, a bone conduction loudspeaker may directly transmit sound waves (vibration signals) transformed from electrical signals to an auditory center through bones. In addition, the sound waves may be transmitted to the auditory center through air conduction. Details for illustrating the air conduction may be found elsewhere in the present disclosure.

In step 104, the sound information may be transmitted to a sensing terminal. In some embodiments, the sound information may be transmitted to the sensing terminal through the transmission system. In a working scenario, the loudspeaker apparatus may pick up or generate signals including sound information, convert the sound information into sound vibrations through a transduction apparatus, and transmit sound to the sensing terminal through the transmission system. A human may finally hear the sound. In some embodiments, the subjects of the sensing terminal, the hearing system, sensory organs, etc., may be humans or animals that have hearing systems. It should be noted that the following description of the use of loudspeaker apparatus by humans does not constitute a limitation on the use of loudspeaker apparatus. Similar descriptions may be also applied to other animals.

The above descriptions of general processes of the loudspeaker apparatus is only a concrete example, and should not be considered as the only feasible implementation solution. Obviously, for those skilled in the art, after understanding the basic principles of the loudspeaker apparatus, it is possible to make various modifications and changes in the form and details of the specific ways and steps of implementing the loudspeaker apparatus without departing from this principle, but these modifications and changes are still within the scope described above.

The loudspeaker apparatus may include a headphone, a MP3 player, a hearing aid, or the like, or any combination thereof. The MP3 player may be taken as an example to describe the loudspeaker apparatus in detail.

Figure 2:
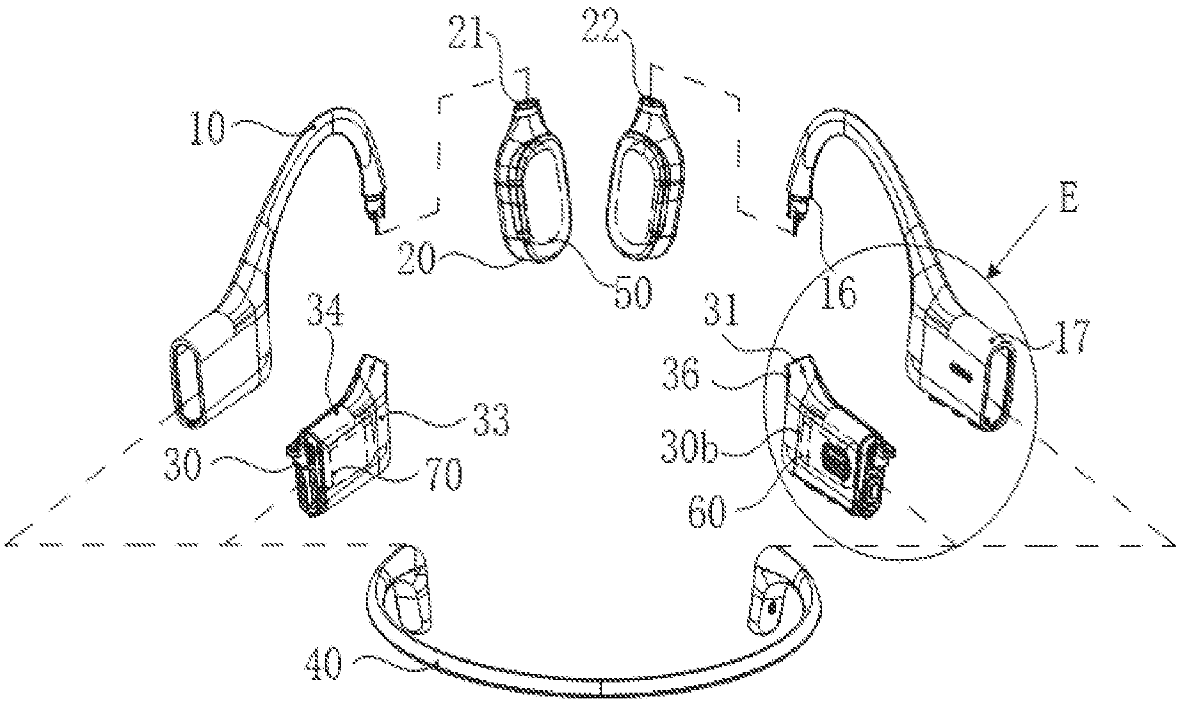
FIG. 2 is a structural schematic diagram illustrating an exploded view of an MP3 player according to some embodiments of the present disclosure.

FIG. 2 is a structural schematic diagram illustrating an exploded view of an MP3 player according to some embodiments of the present disclosure.

As shown in FIG. 2, the MP3 player may include an ear hook 10, a housing 20 of an earphone core 50, a circuit housing 30, a rear hook 40, the earphone core 50, a control circuit 60, and a battery 70. The housing 20 of the earphone core 50 and the circuit housing 30 may respectively be disposed at both ends of the ear hook 10, and a rear hook 40 may further be disposed at an end of the circuit housing 30 away from the ear hook 10. The count of the housing 20 of the earphone core 50 may be two, which are respectively configured to accommodate the earphone core 50. The count of the circuit housing 30 may be two, which are respectively configured to accommodate the control circuit 60 and the battery 70. The two ends of the rear hook 40 may respectively be connected to a corresponding circuit housing 30.

Figure 3:
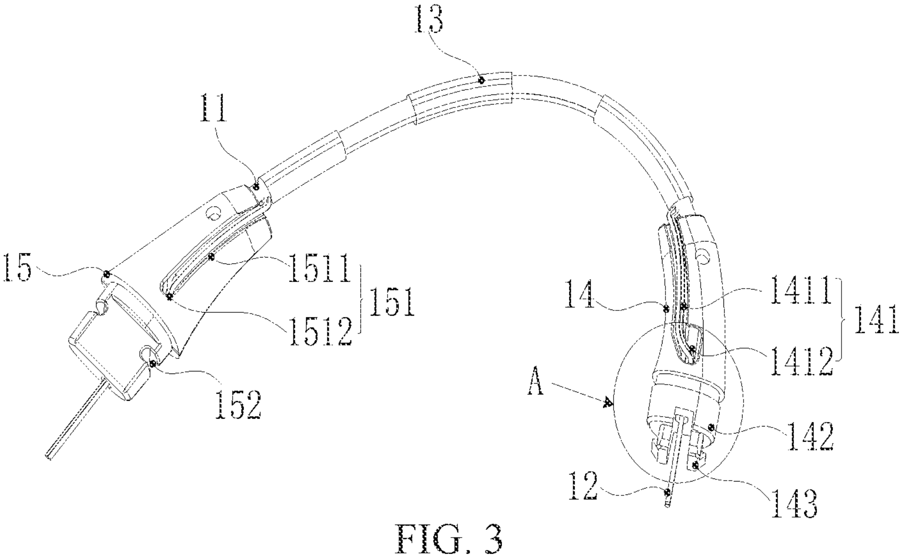
FIG. 3 is a structural schematic diagram illustrating parts of an ear hook of an MP3 player according to some embodiments of the present disclosure.
Figure 4:
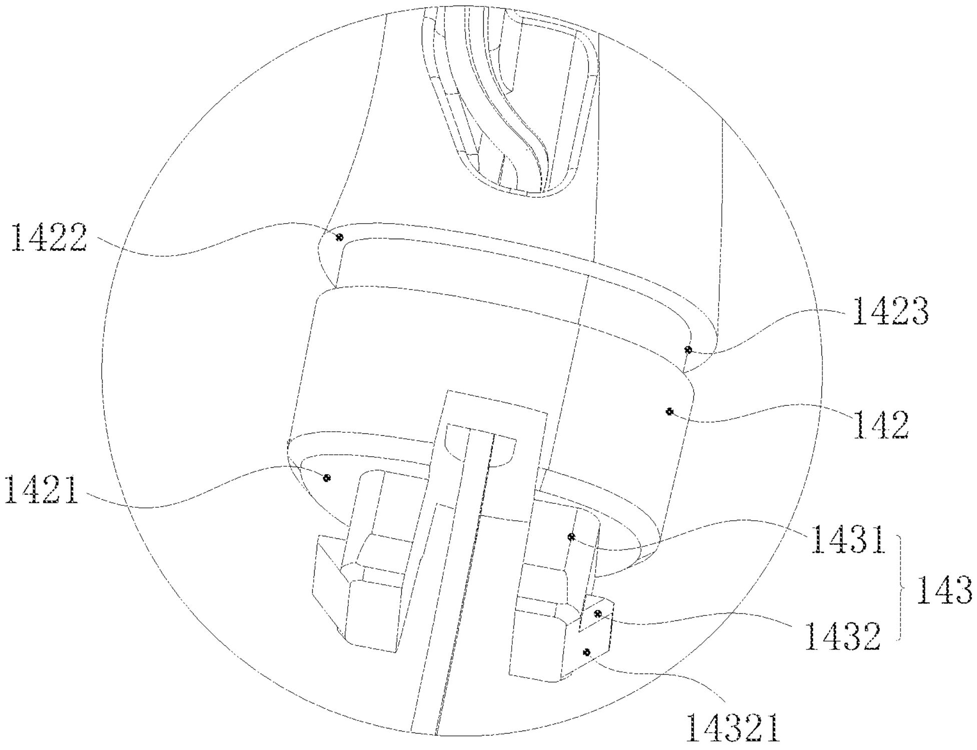
FIG. 4 is a schematic diagram illustrating a partial enlarged view of part A in FIG. 3 according to some embodiments of the present disclosure.

FIG. 3 is a structural schematic diagram illustrating parts of an ear hook of an MP3 player according to some embodiments of the present disclosure. FIG. 4 is a schematic diagram illustrating a partial enlarged view of part A in FIG. 3 according to some embodiments of the present disclosure.

Combining FIG. 2, FIG. 3, and FIG. 4, the ear hook 10 may include an elastic metal wire 11, a wire 12, a fixed sleeve 13, a plug end 14 and a plug end 15. The plug end 14 and the plug end 15 may be disposed at two ends of the elastic metal wire 11. The ear hook 10 may further include a protective sleeve 16 and a housing protector 17 integrally formed with the protective sleeve 16.

The protective sleeve 16 may be injection-molded on the periphery of the elastic metal wire 11, the wire 12, the fixed sleeve 13, the plug end 14 and the plug end 15. The protective sleeve 16 may be fixedly connected to the elastic metal wire 11, the wire 12, the fixed sleeve 13, the plug end 14 and the plug end 15, respectively. The protective sleeve 16 does not need to be injection-molded separately and then sheathed on the periphery of the elastic metal wire 11, the plug end 14 and the plug end 15, thereby simplifying the manufacturing and assembly process, and making the fixing of the protective sleeve 16 reliable and stable.

In some embodiments, the plug end 14 and the plug end 15 may respectively be disposed with a first trace channel 141 and a second trace channel 151. The first trace channel 141 may include a first trace slot 1411 and a first trace hole 1412 connected to the first trace slot 1411. The wire 12 at the plug end 14 may extend along the first trace slot 1411 and the first trace hole 1412, and may be exposed on the outer end surface of the plug end 14 to further connect with other structures. Accordingly, the second trace channel 151 may include a second trace slot 1511 and a second trace hole 1512 connected to the second trace slot 1511. The wire 12 at the plug end 15 may extend along the second trace slot 1511 and the second trace hole 1512, and may be exposed on the outer end surface of the plug end 15 to further connect with other structures. An end of the wire 12 of the ear hook 10 located outside the housing 20 of the earphone core 50 may pass through the second trace channel 151 to further connect to external circuits of the control circuit 60, the battery 70, etc. included in the circuit housing 30 outside the earphone core 20. The other end of the wire 12 may be exposed along the first trace channel 141 to the outer end surface of the plug end 14. The wire 12 may enter the housing 20 of the earphone core 50 through the socket hole 22 with the insertion portion 142.

Referring to FIG. 2, in some embodiments, when the protective sleeve 16 is formed, the housing protector 17 disposed on the side near the plug end 15 may integrally be formed with the protective sleeve 16 at the same time. The housing protector 17 may be integrated with the protective sleeve 16 into a whole. The circuit housing 30 may be connected to one end of the ear hook 10 by being fixed to the plug end 15, and the housing protector 17 may further cover the periphery of the circuit housing 30 by sheathing. The protective sleeve 16 and the housing protector 17 may be made of a soft material with a certain elasticity. For example, the material may include a soft silicone, a rubber, etc.

In some embodiments, the housing 20 of the earphone core 50 may be configured to accommodate the earphone core 50 and be fixed to the plug end 14. A count of the earphone core 50 and a count of the housing 20 of the earphone core 50 may be two, corresponding to the left ear and right ear of the user, respectively. For example, during work, the housing 20 of the earphone core 50 may fit near the left and right ears of the user, respectively.

Combining FIG. 2 and FIG. 3, in some embodiments, the housing 20 of the earphone core 50 may be connected with the plug end 14 by inserting, clamping, etc. to fix the housing 20 of the earphone core 50 and the ear hook 10 together. In some embodiments, the ear hook 10 and the housing 20 of the earphone core 50 may be separately molded and then further assembled together, instead of directly molding the two together. In this way, the ear hook 10 and housing 20 of the earphone core 50 may be shaped using respective molds separately rather than using a same large size mold to integrate the two. The size of the mold may be reduced, thereby reducing the processing difficulty of the mold and the molding difficulty. In addition, since the ear hook 10 and the housing 20 of the earphone core 50 are processed by different molds, during the manufacturing process, when the shape or structure of one of the ear hook 10 or the housing 20 of the earphone core 50 needs to be adjusted, it is only necessary to adjust the mold corresponding to the structure rather than adjusting the mold of another structure. The production cost may be reduced. In some embodiments, the ear hook 10 and housing 20 of the earphone core 50 may be made by integral molding according to an application situation.

Figure 5:
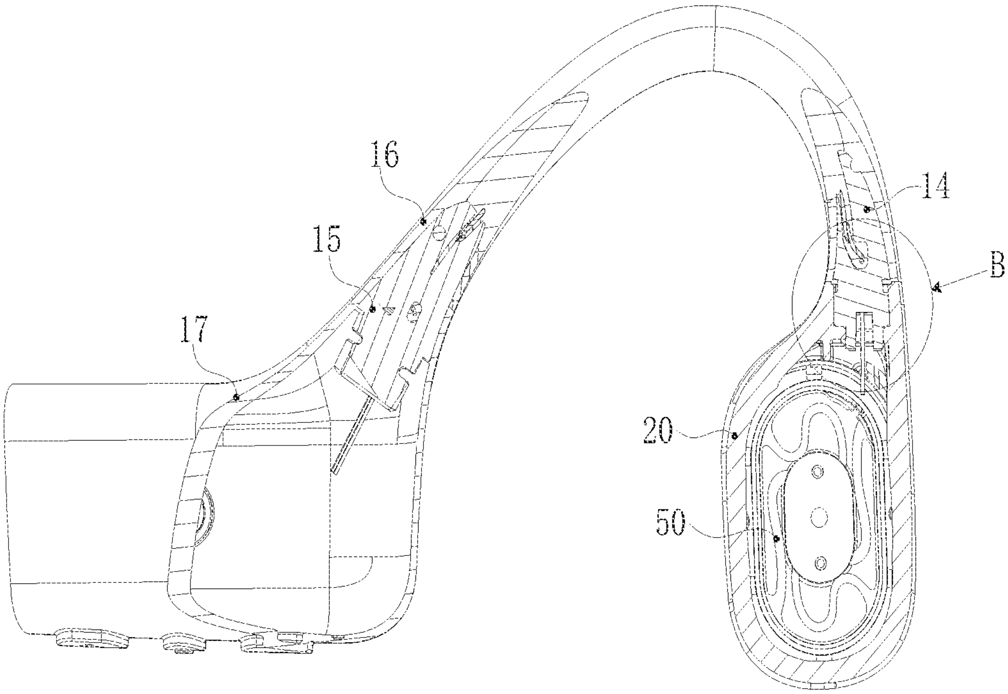
FIG. 5 is a schematic diagram illustrating a partial cross-sectional view of an MP3 player according to some embodiments of the present disclosure.
Figure 6:
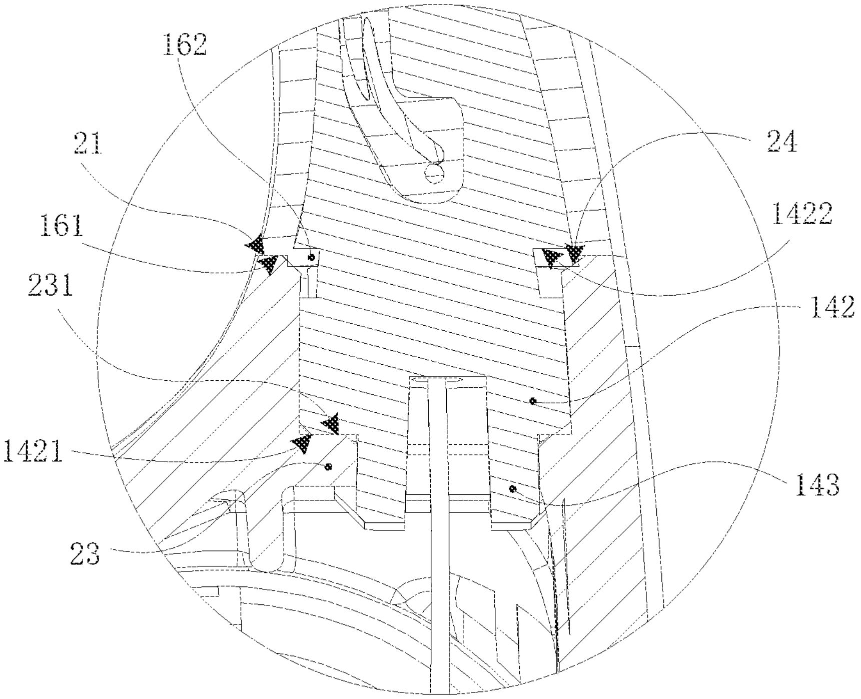
FIG. 6 is a schematic diagram illustrating a partial enlarged view of part B in FIG. 5 according to some embodiments of the present disclosure.

FIG. 5 is a schematic diagram illustrating a partial cross-sectional view of an MP3 player according to some embodiments of the present disclosure. FIG. 6 is a schematic diagram illustrating a partial enlarged view of part B in FIG. 5 according to some embodiments of the present disclosure. Combining FIG. 2, FIG. 5 and FIG. 6, in some embodiments, the housing 20 of the earphone core 50 may be disposed with a socket hole 22 communicating with an outer end surface 21 of the housing 20 of the earphone core 50. An inner wall of the socket hole 22 may be disposed with a stop block 23. The outer end surface 21 of the housing 20 of the earphone core 50 may refer to an end surface of the housing 20 of the earphone core 50 facing the ear hook 10. The socket hole 22 may be configured to provide an accommodation space for inserting the plug end 14 of the ear hook 10 into a housing 20 of the earphone core 50. The plug of the plug end 14 and the housing 20 of the earphone core 50 may be fixed. The stop block 23 may be formed by protruding an inner wall of the socket hole 22 in a direction perpendicular to the inner wall. In some embodiments, the stop block 23 may be a plurality of interval-shaped block-shaped protrusions, or may be a ring-shaped protrusion along the inner wall of socket hole 22, or the like, or any combination thereof.

Combining FIG. 3 and FIG. 6, in some embodiments, the plug end 14 may include an insertion portion 142 and two elastic hooks 143. In some embodiments, the insertion portion 142 may be at least partially inserted into the socket hole 22 and may abut on the outer surface 231 of the stop block 23. The shape of the outer wall of the insertion portion 142 may match the shape of the inner wall of the socket hole 22. When the insertion portion 142 is at least partially inserted into the socket hole 22, the outer wall of the insertion portion 142 may abut the inner wall of the socket hole 22. In some embodiments, the outer surface 231 of the stop block 23 may refer to a side where the stop block 23 is disposed toward the ear hook 10. The insertion portion 142 may also include an end surface 1421 facing the housing 20 of the earphone core 50. The end surface 1421 may match the outer surface 231 of the stop block 23. When the insertion portion 142 is at least partially inserted into the socket hole 22, the end surface 1421 of the insertion portion 142 may be in abutment with the outer surface 231 of the stop block 23.

Combining FIG. 2 and FIG. 4, in some embodiments, the two elastic hooks 143 may be arranged side by side and spaced from each other perpendicularly to the insertion direction and symmetrically disposed on the side of the insertion portion 142 facing the inside of the earphone core 20. Each elastic hook 143 may include a beam portion 1431 and a hook portion 1432, respectively. The beam portion 1431 may be connected to the side of the insertion portion 142 facing the housing 20 of the earphone core 50. The hook portion 1432 may be disposed at an end of the beam portion 1431 away from the insertion portion 142 and may extend perpendicular to the insertion direction. Further, each hook portion 1432 may be disposed with a transition inclined surface 14321 connecting a side surface parallel to the insertion direction and an end surface away from the insertion portion 142.

Combining FIG. 2, FIG. 3, FIG. 4, and FIG. 6, during the installation of the ear hook 10 and housing 20 of the earphone core 50, the socket 14 may gradually enter into the housing 20 of the earphone core 50 from the socket hole 22. When reaching the position of the stop block 23, the two hook portions 1432 of elastic hook 143 may be blocked by the stop block 23. Under the action of external thrust, the stop block 23 may gradually squeeze the transition inclined surface 14321 of the hook portion 1432. The two elastic hooks 143 may be elastically deformed and draw close to each other. When the transition inclined surface 14321 passes the stop block 23 and reaches the side of the stop block 23 near the housing 20 of the earphone core 50, the elastic hook 143 may recover elastically due to the loss of the stop block 23, and may be stuck on the inner side of the stop block 23 facing the inside of housing 20 of the earphone core 50. The stop block 23 card may be placed between the insertion portion 142 and the hook portion 1432 of the plug end 14. The plug of the housing 20 of the earphone core 50 and the plug end 14 may be fixed.

In some embodiments, after the housing 20 of the earphone core 50 is fixed with the plug end 14, the insertion portion 142 may be partially inserted into the socket hole 22. The exposed portion of the insertion portion 142 may be set as a stair-step shape, thereby forming an annular table surface 1422 spaced from the outer end surface 21 of the housing 20 of the earphone core 50. It should be noted that the exposed portion of the insertion portion 142 may refer to the portion of the insertion portion 142 exposed to the housing 20 of the earphone core 50. In some embodiments, the exposed portion of the insertion portion 142 may refer to the portion exposed to the housing 20 of the earphone core 50 and close to the outer end surface of the housing 20 of the earphone core 50.

In some embodiments, the annular table surface 1422 may be opposite to the outer end surface 21 of the housing 20 of the earphone core 50. The interval between the two may refer to the interval along the insertion direction and the interval perpendicular to the insertion direction. In some embodiments, the protective sleeve 16 may extend to the side of the annular table surface 1422 facing the outer end surface 21 of the housing 20 of the earphone core 50. The protective sleeve 16 may fill the space between the annular table surface 1422 and the outer end surface 21 of the housing 20 of the earphone core 50 when the socket hole 22 of the housing 20 of the earphone core 50 is fixed with the plug end 14. The protective sleeve 16 may flexibly abut with housing 20 of the earphone core 50, which makes it difficult for external liquids to enter into the interior of the housing 20 of the earphone core 50 from the joint between the plug end 14 and the housing 20 of the earphone core 50, thereby achieving the seal between the socket 14 and the socket hole 22. The earphone core 50 inside the housing 20 of the earphone core 50, etc., may be protected. The waterproof effect of the MP3 player may be improved.

Figure 7:
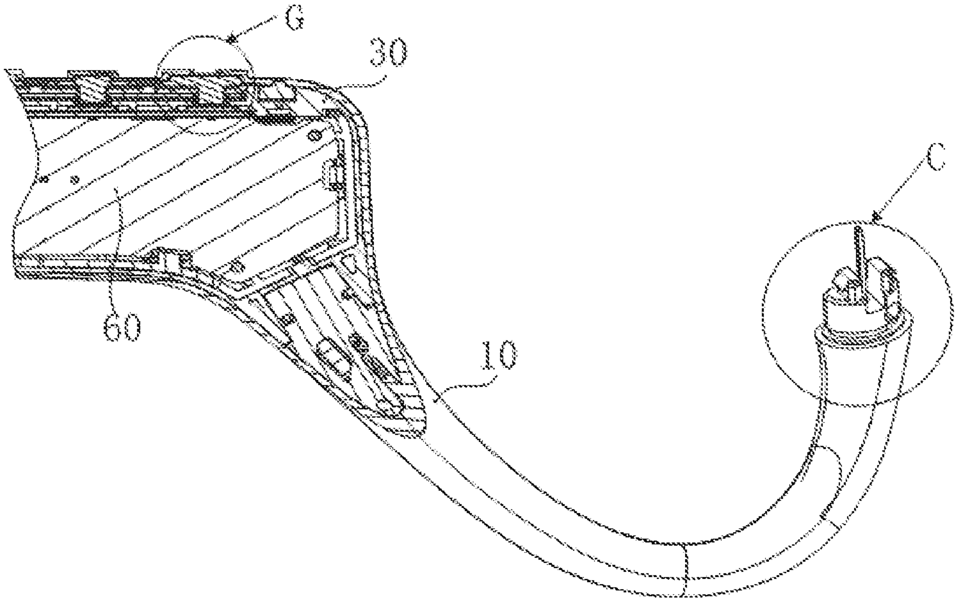
FIG. 7 is a schematic diagram illustrating a partial structural cross-sectional view of an MP3 player according to some embodiments of the present disclosure.
Figure 8:
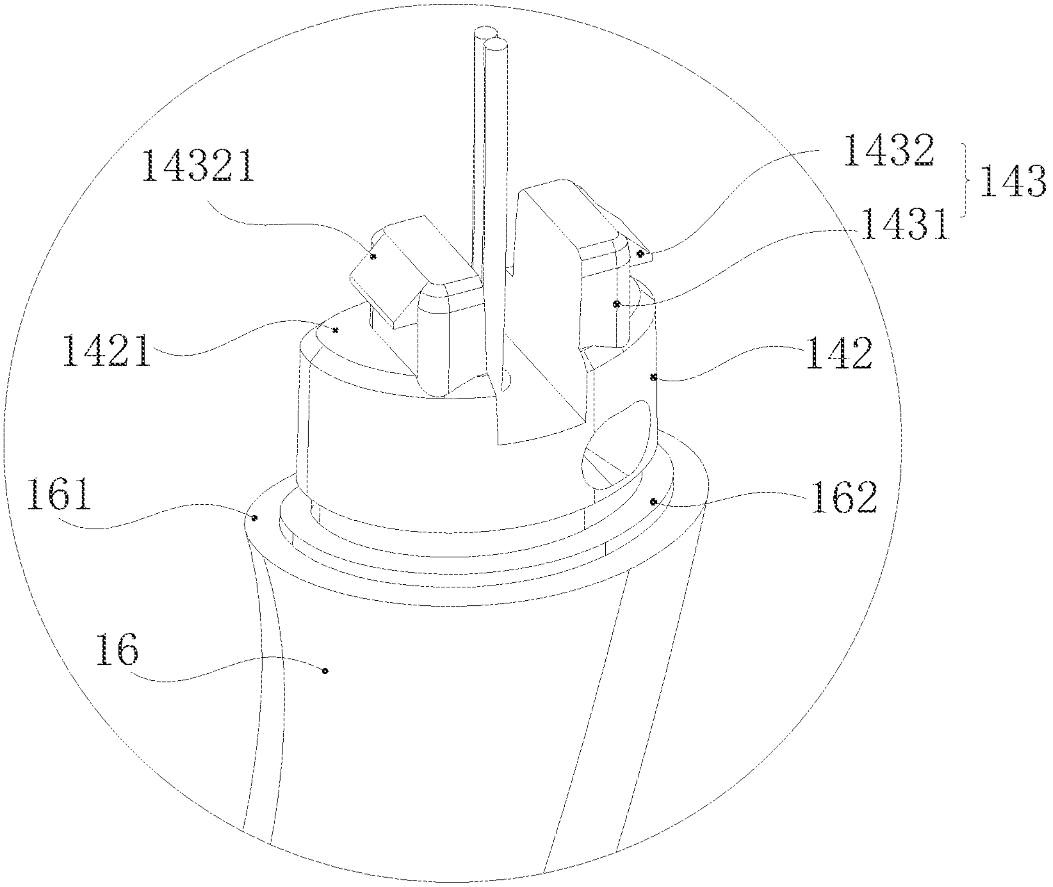
FIG. 8 is a schematic diagram illustrating a partial enlarged view of part C in FIG. 7 according to some embodiments of the present disclosure.

FIG. 7 is a schematic diagram illustrating a partial structural cross-sectional view of an MP3 player according to some embodiments of the present disclosure. FIG. 8 is a schematic diagram illustrating a partial enlarged view of part C in FIG. 7 according to some embodiments of the present disclosure. Combining FIG. 2, FIG. 7 and FIG. 8, in some embodiments, the protective sleeve 16 may form an annular abutting surface 161 on the side of the annular table surface 1422 facing the outer end surface 21 of the housing 20 of the earphone core 50. The annular abutting surface 161 may be an end face of the protective sleeve 16 facing the housing 20 of the earphone core 50 side.

In some embodiments, the protective sleeve 16 may further include an annular boss 162 located inside the annular abutting surface 161 and protruding from the annular abutting surface 161. In some embodiments, the annular boss 162 may be formed on a side of the annular abutting surface 161 facing the plug end 14, and may be protruded from the annular abutting surface 161 in a direction toward the housing 20 of the earphone core 50. In some embodiments, the annular boss 162 may also be directly formed on the periphery of the annular table surface 1422 and cover the annular table surface 1422.

Combining FIG. 2, FIG. 6 and FIG. 8, in some embodiments, the housing 20 of the earphone core 50 may include an inclined surface 24 for connecting an outer end surface 21 of the housing 20 of the earphone core 50 and an inner sidewall of the socket hole 22. The inclined surface 24 for connecting may be a transition surface between the outer end surface 21 of the housing 20 of the earphone core 50 and the inner sidewall of the socket hole 22. The inclined surface 24, the outer end surface 21 of the housing 20 of the earphone core 50, and the inner wall of the socket hole 22 may not be on the same plane. The inclined surface 24 may be a flat surface, or may be a curved surface according to actual application situations, or other shapes, or the like, or any combination thereof.

In some embodiments, when the housing 20 of the earphone core 50 and the plug end 14 are plugged and fixed, the annular abutting surface 161 and the annular boss 162 may elastically abut against the outer end surface of the housing 20 of the earphone core 50 and the inclined surface 24, respectively. It should be noted that since the outer end surface 21 and the inclined surface 24 of the housing 20 of the earphone core 50 are not on the same plane, the elastic abutment between the protective sleeve 16 and the housing 20 of the earphone core 50 may be not on the same plane, which makes it difficult for external liquids to enter into the housing 20 of the earphone core 50 from between the protective sleeve 16 and the housing 20 of the earphone core 50. The external liquids may be difficult to enter into the earphone core 50. The waterproof effect of the MP3 player may be improved to protect the internal function structure, thereby extending the service life of the MP3 player.

Combining FIG. 2, FIG. 4, and FIG. 6, in some embodiments, the insertion portion 142 may form an annular groove 1423 on a side of the annular table surface 1422 facing the outer end surface 21 of the housing 20 of the earphone core 50 adjacent to the annular table surface 1422. The annular boss 162 may be formed in the annular groove 1423. In some embodiments, the annular groove 1423 may be formed on a side of the annular table surface 1422 facing the housing 20 of the earphone core 50. In some embodiments, the annular table surface 1422 may be a sidewall surface of the annular groove 1423 facing a side of the housing 20 of the earphone core 50. The annular boss 162 may be formed in the annular groove 1423 along the sidewall surface.

Figure 9:
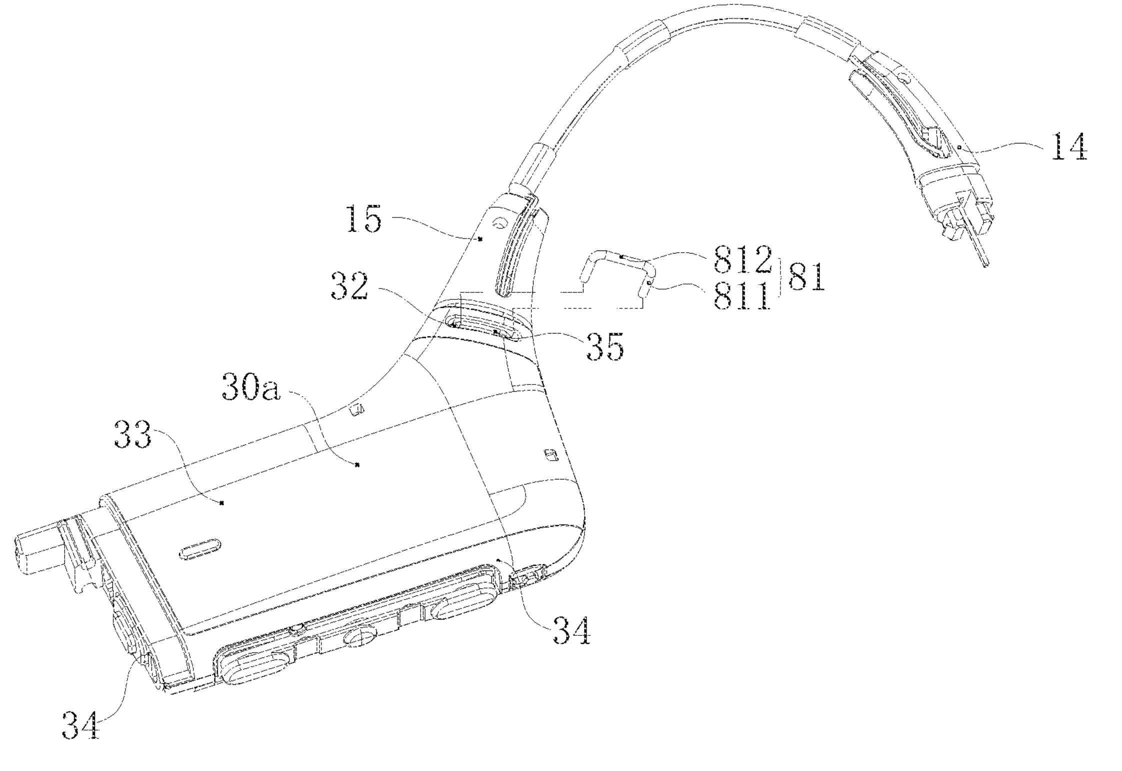
FIG. 9 is a schematic diagram illustrating an exploded view of a circuit housing and an ear hook of an MP3 player according to some embodiments of the present disclosure.
Figure 10:
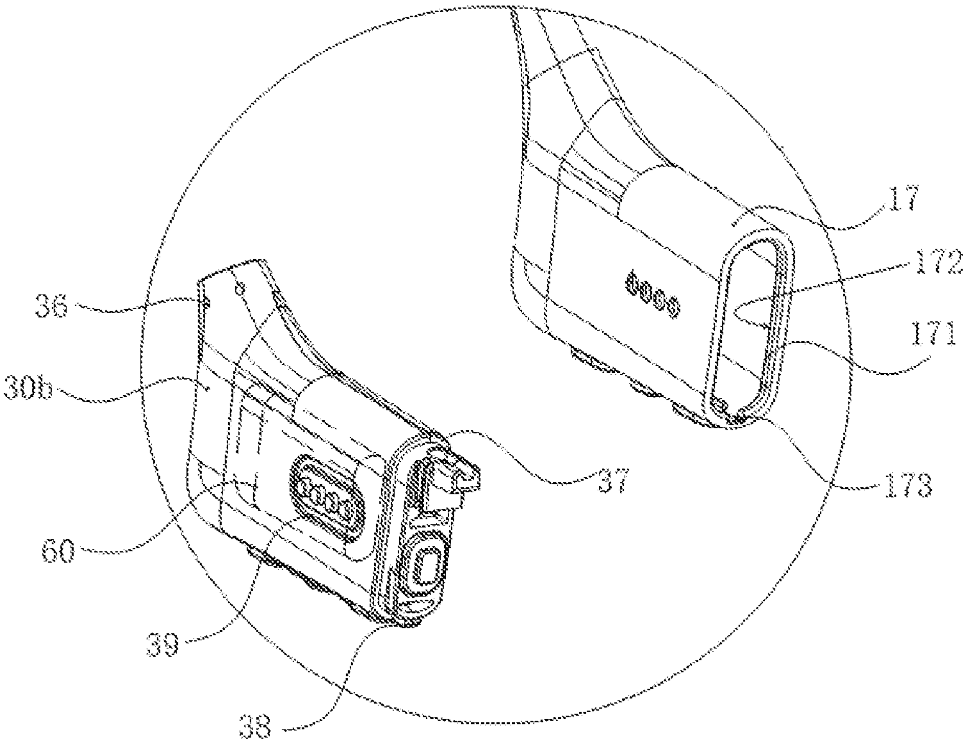
FIG. 10 is a schematic diagram illustrating a partial enlarged view of part E in FIG. 2 according to some embodiments of the present disclosure.

FIG. 9 is a schematic diagram illustrating a partial exploded view of a circuit housing and an ear hook in an MP3 player according to some embodiments of the present disclosure. FIG. 10 is a schematic diagram illustrating a partial cross-sectional view of a partial structure of an MP3 player according to some embodiments of the present disclosure.

Combining FIG. 2, FIG. 3, FIG. 9 and FIG. 10, in some embodiments, the circuit housing 30 may be fixed to the plug end 15, so that the circuit housing 30 may be fixed at the end of the ear hook 10 away from the housing 20 of the earphone core 50. When the user wears the MP3 player, the circuit housing 30 that accommodates the battery 70 and the circuit housing 30 that accommodates the control circuit 60 may correspond to the left and right sides of the user. The circuit housing 30 that accommodates the battery 70 and the circuit housing 30 that accommodates the control circuit 60 may have different connection manners with the corresponding plug end 15. In some embodiments, the circuit housing 30 may be connected to the plug end 15 by inserting, clamping, etc. In some embodiments, the ear hook 10 and the circuit housing 30 may be separately formed separately, and then further assembled together after the molding is completed, instead of directly forming the two integrally. In this way, the ear hook 10 and the circuit housing 30 may be formed separately by using their corresponding molds, rather than using the same larger mold to integrate the two. The size of the forming mold may be reduced to reduce the processing difficulty of the mold and the forming difficulty. In addition, since the ear hook 10 and the circuit housing 30 are processed by different molds, during the manufacturing process, when the shape or structure of one of the ear hook 10 or the circuit housing 30 needs to be adjusted, it is only necessary to adjust the mold corresponding to the structure. It is not necessary to adjust the mold of another structure, thereby reducing production costs.

In some embodiments, the circuit housing 30 may be disposed with a socket hole 31. The shape of the inner surface of the socket hole 31 may be matched with the shape of at least a part of the outer surface of the plug end 15. The plug end 15 may be inserted at least partially into the socket hole 31. In some embodiments, slots 152 may be disposed on opposite sides of the plug end 15 and perpendicular to the insertion direction of the plug end 15 with respect to the socket hole 31, respectively. In some embodiments, the two slots 152 may be symmetrical and spaced from each other on the opposite sides of the plug end 15. The two slots 152 may communicate with the sidewall of the plug end 15 in a vertical direction along the insertion direction.

The circuit housing 30 may be disposed in a flat shape. For example, the cross section of the circuit housing 30 at the second socket hole 31 may be oval, or other shapes capable of forming a flat shape. In some embodiments, the circuit housing 30 may have two oppositely disposed sidewalls with a larger area as the main sidewall 33, and the two oppositely disposed sidewalls with a smaller area connecting the two main sidewalls 33 may be auxiliary sidewalls 34. In some embodiments, a first sidewall 30*a* of the circuit housing 30 may be either the main sidewall 33 of the circuit housing 30 or an auxiliary sidewall 34 of the circuit housing 30, which may be specifically set according to actual needs. In some embodiments, the circuit housing 30, the cross-section at socket hole 31 may have other shapes (e.g., a circle), which may be determined according to different application scenarios.

In some embodiments, the MP3 player may further include a fixing component 81. The fixing component 81 may include two pins 811 disposed in parallel and a connection portion 812 for connecting the pins 811. In some embodiments, the connection portion 812 may be vertically connected to one end of the two pins 811 facing the same direction, thereby forming a U-shaped fixing component 81. In some embodiments, the first sidewall 30*a* of the circuit housing 30 may be disposed with two through holes 32 through the first sidewall 30*a* corresponding to the positions of the two slots 152. One end of the two pins 811 away from the connection portion 812 may be inserted into the slot 152 from the outside of the circuit housing 30 through the through hole 32. The connection portion 812 may be blocked from the outside of the circuit housing 30, thereby achieving the circuit housing 30 and the plug end 15 are fixed plugged.

In some embodiments, a strip-shaped groove 35 may be formed on the first sidewall 30*a* of the circuit housing 30 for connecting two through holes 32. When the fixing component 81 is used for plugging and fixing, the connection portion 812 may be further partially or completely sunk in the strip-shaped groove 35. Therefore, the overall MP3 player may be made more unified. The housing protector 17 sheathed on the periphery of the circuit housing 30 may be not formed with a groove corresponding to the connection portion 812, thereby simplifying the mold of the housing protector 17. The space occupied by the MP3 player as a whole may be reduced.

In some embodiments, after the connection portion 812 is partially or completely sunk in the strip-shaped groove 35, glue may be further applied in the strip-shaped groove 35. In this way, the fixing component 81 may be fixed on the circuit housing 30 The connection between the plug end 15 and the socket hole 31 may be more stable. After the connection portion 812 is sunk in the strip-shaped groove 35, the strip-shaped groove 35 is further filled by sizing so as to be consistent with the first sidewall 30*a* of the circuit housing 30. After installing the housing protector 17, a connection between the strip-shaped groove 35 and the surrounding structure may be smooth and coherent.

Combining FIG. 2, FIG. 3, and FIG. 9, in some embodiments, the second sidewall 30*b* of the circuit housing 30 opposite to the first sidewall 30*a* of the circuit housing 30 may further be disposed with a through hole 36 opposite to the through hole 32. The pin 811 may further be inserted into the through hole 36 through the slot 152. In some embodiments, the first sidewall 30*a* of the circuit housing 30 and the second sidewall 30*b* of the circuit housing 30 may each be the main sidewall 33 or the auxiliary sidewall 34 of the circuit housing 30. In some embodiments, the first sidewall 30*a* and the second sidewall 30*b* of the circuit housing 30 may be two opposite main sidewalls 33 of the circuit housing 30. The two through holes 32 and two through-holes 36 may respectively be disposed on a larger area sidewall of the circuit housing 30. A larger interval may be set between the two pins 811 of the fixing component 81 to increase the span of the fixing component 81, thereby improving the stability of the insertion between the plug end 15 and the socket hole 31.

In some embodiments, the pin 811 may be inserted into the slot 152 through the through hole 32 and may further be inserted into the through hole 36 through the slot 152. The pin 811 may completely penetrate and fix the two opposite main sidewalls 33 of the circuit housing 30 and the plug end 15 together. The insertion between the plug end 15 and the circuit housing 30 may be made firmly.

In some embodiments, when the protective sleeve 16 is formed, the housing protector 17 disposed on the side near the plug end 15 may be formed integrally with the protective sleeve 16. The housing protector 17 may be formed separately from the circuit housing 30. The shape of the inner wall of the housing protector 17 may match the shape of the outer wall of the circuit housing 30. After the two are separately formed, the housing protector 17 may cover the periphery of the circuit housing 30 by the way of sheathing. In some embodiments, due to the high ambient temperature during the molding of the housing protector 17, the high temperature environment may cause certain damage to the control circuit 60 or the battery 70 contained in the circuit housing 30. Therefore, in the molding stage, the circuit housing 30 and the housing protector 17 may be separately molded, and then sheathed together. Damage to the control circuit 60 or the battery 70 caused by the high temperature of the housing protector 17 during molding may be avoided, thereby reducing the adverse effect of the molding on the control circuit 60 or the battery 70. Further, the housing protector 17 may be a bag-like structure with an open end, so that the circuit housing 30 enters the interior of the housing protector 17 through the open end of the housing protector 17.

In some embodiments, after the housing protector 17 is formed integrally with the protective sleeve 16, the housing protector 17 may be removed from the mold by rolling the housing protector 17 from the open end. When performing a visual inspection of the housing protector 17 and a surface treatment (e.g., silk screen), the housing protector 17 may be further sleeved on a preset structure for operation through the opening. After the operation is completed, the housing protector 17 may be further removed from the preset structure by rolling the housing protector 17 from the opening. After the inspection and processing operations are completed, the housing protector 17 may be further sheathed on the periphery of the circuit housing 30 through the opening. In the above operations, protecting protector 17 may be removed by the rolling mean, an inflation mean, or the like, or any combination thereof.

In some embodiments, the open end of the housing protector 17 may be the end of the housing protector 17 facing away from the protective sleeve 16. The circuit housing 30 may be covered by the housing protector 17 by entering into the inside of the housing protector 17 from the end of the housing protector 17 away from the protective sleeve 16.

Figure 11:
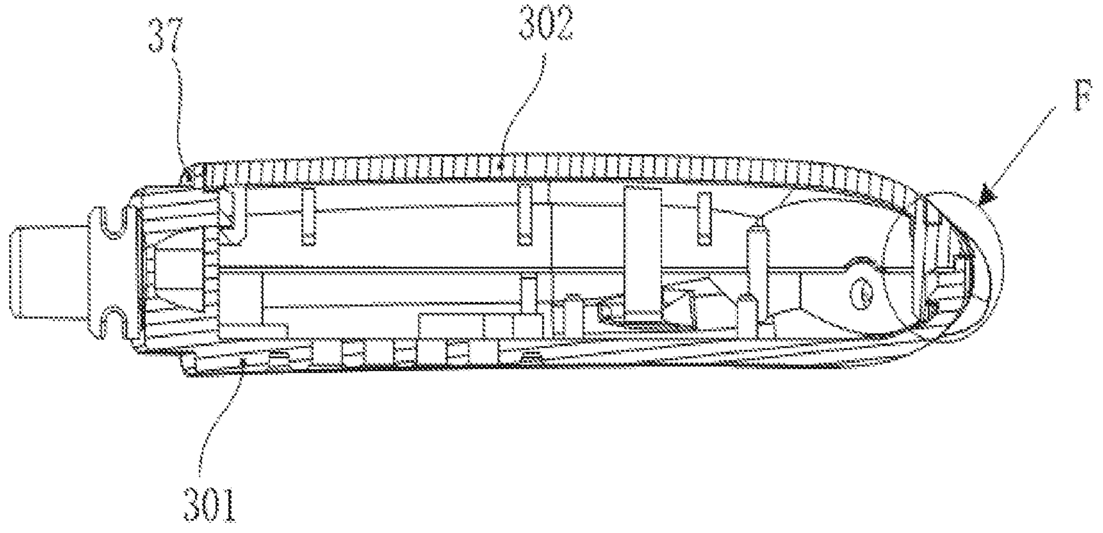
FIG. 11 is a schematic diagram illustrating a sectional view of a circuit housing of an MP3 player according to some embodiments of the present disclosure.

FIG. 11 is a schematic diagram illustrating a partial enlarged view of part E in FIG. 2 according to some embodiments of the present disclosure. Combining FIG. 1 and FIG. 11, in some embodiments, the open end of the housing protector 17 may be disposed with an annular flange 171 protruding inward. Further, the end of the circuit housing 30 away from the ear hook 10 may be set as a stair-step shape, thereby forming an annular table surface 37. When the housing protector 17 covers the periphery of the circuit housing 30, the annular flange 171 may abut on the annular table 37. In some embodiments, the annular flange 171 may be formed by the inner wall surface of the open end of the housing protector 17 protruding to a certain thickness toward the inside of the housing protector 17 and may include a flange surface 172 facing the ear hook 10. The ring-shaped table surface 37 may be opposite to the flange surface 172 and may face the direction of the circuit housing 30 facing away from the ear hook 10. The height of the flange surface 172 of the annular flange 171 may be not greater than the height of the annular table surface 37, so that when the flange surface 172 of the annular flange 171 is in contact with the annular table surface 37, the inner wall surface of the housing protector 17 may fully abut against the sidewall surface of the circuit housing 30. The housing protector 17 may closely cover the periphery of the circuit housing 30. In some embodiments, a sealant may be further applied in a joint region on the annular flange 171 and the annular mesa 37. In some embodiments, when the housing protector 17 is sheathed, the ring-shaped table 37 may be coated with a sealant, thereby sealing the housing protector 17 and the circuit housing 30.

In some embodiments, the circuit housing 30 may further be disposed with a positioning block 38. The positioning block 38 may be disposed on the annular table 37 and may extend along a direction away from the ear hook 10 in the circuit housing 30. In some embodiments, the positioning block 38 may be disposed on the auxiliary sidewall 34 of the circuit housing 30. In some embodiments, the thickness of the positioning block 38 protruding on the auxiliary sidewall 34 may be consistent with the height of the annular table surface 37. The count of positioning blocks 38 may be one or more than one. In some embodiments, the annular flange 171 of the housing protector 17 may be disposed with a positioning slot 173 corresponding to the positioning block 38. When the housing protector 17 covers the periphery of the circuit housing 30, the positioning slot 173 may cover at least a portion of the positioning block 38. In this way, when the housing protector 17 is sheathed, the housing protector 17 may be positioned according to the positions of the positioning block 38 and the positioning slot 173. The housing protector 17 may be installed quickly and accurately. In some embodiments, there may be no positioning block.

Figure 12:
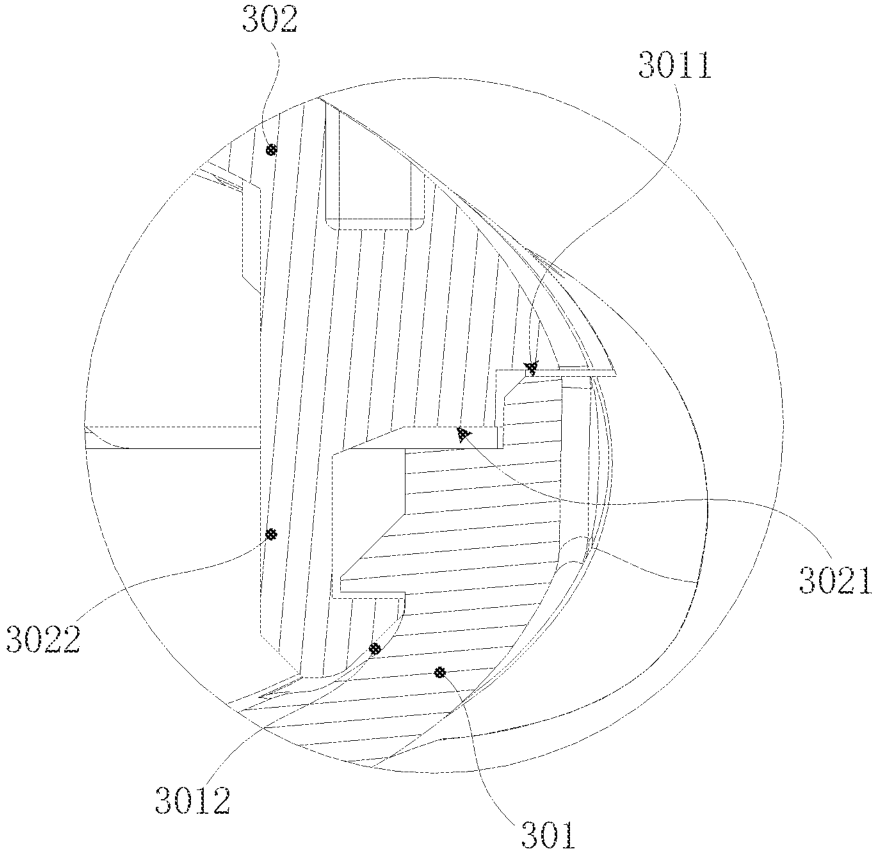
FIG. 12 is a schematic diagram illustrating a partial enlarged view of part F in FIG. 11 according to some embodiments of the present disclosure.

FIG. 11 is a schematic diagram illustrating a sectional view of a circuit housing in an MP3 player according to some embodiments of the present disclosure. FIG. 12 is a schematic diagram illustrating a partial enlarged view of part F in FIG. 11 according to some embodiments of the present disclosure.

Combining FIG. 2, FIG. 11, in some embodiments, the circuit housing 30 may include two sub-housings that are fastened to each other, respectively. The two sub-housings may include a first sub-housing 301 and a second sub-housing 302. In some embodiments, the two sub-housings may be fastened symmetrically along the center line of the circuit housing 30. In some embodiments, the two sub-housings may be fastened in other ways according to different application scenario. In some embodiments, the way of fastening the two sub-housings of the circuit housing 30 that accommodates the control circuit 60 may be the same as that of the two sub-housings of the circuit housing 30 that accommodates the battery 70. In some embodiments, the way of fastening the two sub-housings of the circuit housing 30 that accommodates the control circuit 60 may be the different from that of the two sub-housings of the circuit housing 30 that accommodates the battery 70.

In some embodiments, the circuit housing 30, a ring-shaped table 37 may be formed on the first sub-housing 301, and the two sub-housings may be joined on a side of the ring-shaped table 37 facing the ear hook 10, so that the housing protector 17 can fully cover the joint seam of the two sub-housings, which can seal the internal space of the circuit housing 30 to improve the waterproof effect of the MP3 player.

In some embodiments, the ring-shaped table 37 of the circuit housing 30 may be jointly formed by two sub-housings. At least part of the two may be combined at the side of the ring-shaped table 37 facing away from the ear hook 10. At this time, the housing protector 17 may not cover the joint seam of the two sub-housings on the side of the ring-shaped table 37 facing away from the ear hook 10. In some embodiments, other means may be used to cover the joint seam of the two sub-housings.

Combining FIG. 2 and FIG. 12, in some embodiments, the joint surfaces of two sub-housings abutting each other may have stair-step shapes that fit each other. In some embodiments, an end surface of the first sub-housing 301 facing the second sub-housing 302 may be a first stepped surface 3011 that has a stair-step shape. The end surface of the second sub-housing 302 facing the first sub-housing 301 may be a second stepped surface 3021 that has a stair-step shape. The shapes and sizes of the first stepped surface 3011 and the second stepped surface 3021 may be the same. The first stepped surface 3011 and the second stepped surface 3021 may fit and abut against each other. The joint surface of the two sub-housings of the circuit housing 30 that connect each other may have stair-step shapes instead of on the same plane. The liquid outside the circuit housing 30 may be blocked from entering the inside of the circuit housing 30 from the periphery of the circuit housing 30. The waterproof effect of the MP3 player may be improved to protect the control the circuit 60 or the battery 70 inside the circuit housing 30.

In some embodiments, a mounting hook 3022 facing the first sidewall **30*a* may be disposed on the second stepped surface 3021 of the second sub-housing 302. Correspondingly, a mounting hook groove 3012 matching the mounting hook 3022 may be disposed inside the first sub-housing 301. When mounting the first sub-housing 301 and the second sub-housing 302, the mounting hook 3022 may enter the mounting hook groove 3012 beyond the outer sidewall of the mounting hook groove 3012 by external thrust. The hook portion of the mounting hook 3022 may hook the inner sidewall of the mounting hook groove 3012, thereby fastening the first sub-housing 301 and the second sub-housing 302**.

Figure 13:
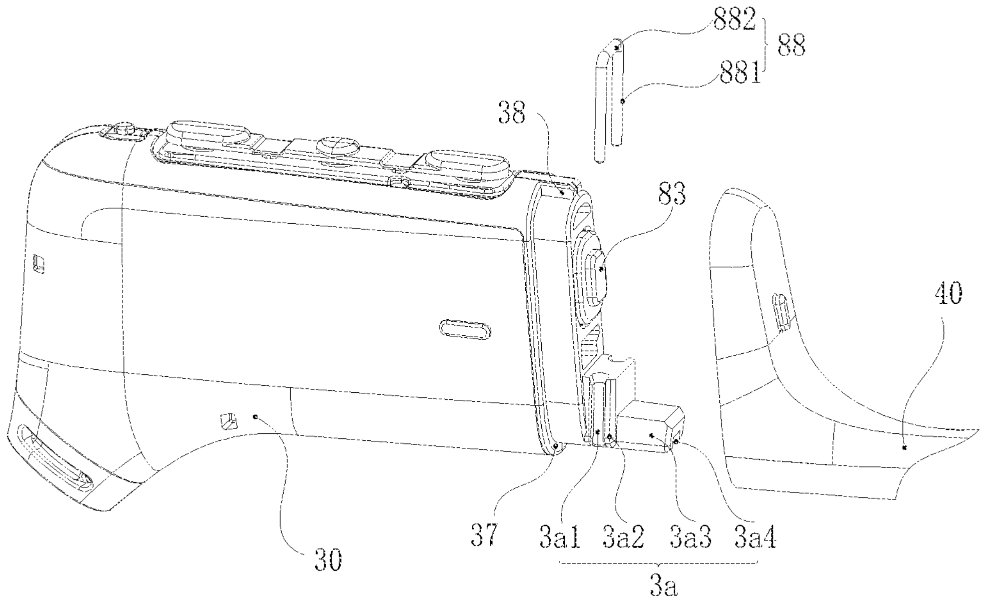
FIG. 13 is a schematic diagram illustrating a partial structural exploded view of a circuit housing and a rear hook of an MP3 player according to some embodiments of the present disclosure.
Figure 14:
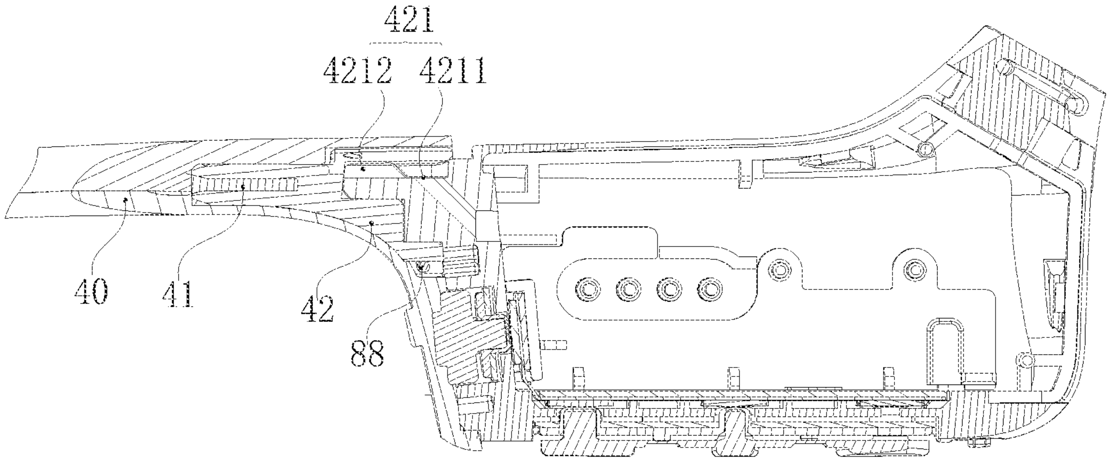
FIG. 14 is a schematic diagram illustrating a partial structural cross-sectional view of a circuit housing and a rear hook of an MP3 player according to some embodiments of the present disclosure.
Figure 15:
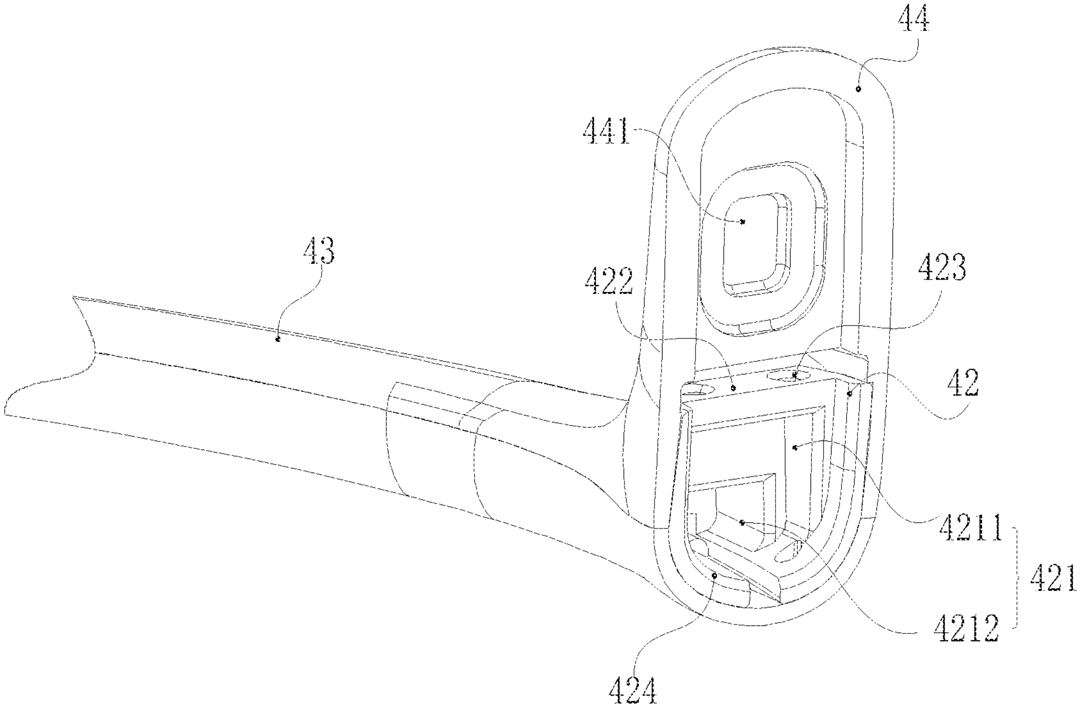
FIG. 15 is a partial structural schematic diagram illustrating a rear hook of an MP3 player according to some embodiments of the present disclosure.

FIG. 13 is a schematic diagram illustrating an exploded view of a circuit housing and a rear hook of an MP3 player according to some embodiments of the present disclosure. FIG. 14 is a schematic diagram illustrating a partial structural cross-sectional view of a circuit housing and a rear hook of an MP3 player according to some embodiments of the present disclosure. FIG. 15 is a partial structural schematic diagram illustrating a rear hook of an MP3 player according to some embodiments of the present disclosure.

Combining FIG. 2, FIG. 13, FIG. 14, in some embodiments, the circuit housing 30 is further disposed with a plug end **3*a* at an end remote from the ear hook 10. The rear hook 40 may include an elastic metal wire 41 and plug ends 42 disposed at both ends of the elastic metal wire 41. The plug end 3*a* and the plug end 42** may be fixed to each other.

In some embodiments, the MP3 player may include two earphone core 50 on both the left side and the right side. The corresponding housing 20 of the earphone core 50, the ear hook 10, and the circuit housing 30 may also be two on both the left side and the right side. The housing 20 of the earphone core 50, the ear hook 10, and the circuit housing 30 may connect by inserting and fixing the rear hook 40 with two the circuit housings 30. The rear hook 40 may be hung on back of the user's head when worn by the user. The plug end 42 may be formed at both ends of the elastic metal wire 41 by injection-molding. In some embodiments, the plug end 42 may be made of plastic.

In some embodiments, the plug end 42 may be disposed with a socket hole 421. The socket end **3*a* may be at least partially inserted into the socket hole 421. In some embodiments, the socket end 3*a* may be specifically disposed on a side of the ring-shaped table 37 facing away from the ear hook 10. The insertion way between the plug end 3*a* and the socket hole 421 and the insertion way between the plug end 15 and the socket hole 31** may be the same or different.

In some embodiments, slots **3*a*1 may be disposed on opposite sides of the plug end 3*a*. The slots 3*a*1 may be perpendicular to the insertion direction of the plug end 3*a* with respect to the socket hole 421. The two slots 3*a*1 may be spaced and symmetrically disposed on both sides of the plug end 3*a*. In some embodiments, the two slots 3*a*1 may connect with the corresponding sidewall of the plug end 3*a*** along a direction perpendicular to the insertion direction.

In some embodiments, the first sidewall 422 of the plug end 42 may be disposed with a through hole 423 corresponding to the positions of the two slots **3*a*1. The plug end 42 may include a sidewall for defining a surrounding of the socket hole 421. The first sidewall 422 of the plug end 42 may be a sidewall that the plug end 42 may intersect with the extending direction of the slot 3*a*1 when the plug end 3*a*** is plugged and fixed.

The MP3 player may further include a fixing component 88. The fixing component 88 may include two pins 881 and a connection portion 882 for connecting the pins 881. In some embodiments, two pins 881 may be arranged in parallel, and the connection portion 882 may be vertically connected to the same side of the two pins 881 to form a U-shaped fixing component 88 having a shape similar to the fixing component 81. It should be noted that the fixing component 88 may be similar in shape to the fixing component 81. In some embodies, the specific dimensional parameters of the fixing component 88 and the fixing component 81 may be different based on different surrounding structures. In some embodiments, the length of the pin 881 may be greater than the length of the pin 811. In some embodiments, the length of the connection portion 812 may be less than the length of the connection portion 882. In some embodiments, the pin 881 may be inserted into the slot **3*a*1 from the outside of the plug end 42 through the through hole 423. The connection portion 882 may be blocked to the outside of the plug end 3*a*, thereby realizing the plug fixing of the plug end 42 and the plug end 3*a***.

In some embodiments, the fixing component 88 of the MP3 player may include two pins 881 arranged in parallel and a connection portion 882 for connecting the pins 881. The fixing component 88 may fix the plug end **3*a* and the plug end 42 over a certain span. The fixing between the circuit housing 30 and the rear hook 40 may be more stable and reliable. In some embodiments, the fixing component 88 may have a simple structure and may be easy to insert and remove. The insertion between the plug end 3*a* and the plug end 42 may be detachable, and the assembly of the MP3 player may be convenient. In some embodiments, the second sidewall 424 opposite to the first sidewall 422 of the plug end 42 may further be disposed with a through hole 425 opposite to the through hole 423. The pin 881 may further be inserted into the through hole 425 through the slot 3*a*1**.

In some embodiments, the pin 881 may be inserted into the slot **3*a*1 through the through hole 423, and may further be inserted into the through hole 425 through the slot 3*a*1. The pin 881 may completely penetrate and connect with the two opposite sidewalls of the plug end 42 of the rear hook 40 and the plug end 3*a*. The insertion between the circuit housing 30 and the rear hook 40** may be firm.

In some embodiments, the plug end **3*a* may be divided into a first plug section 3*a*2 and a second plug section 3*a*3 along the insertion direction of the plug end 3*a* relative to the socket hole 421. The plug end 3*a* may be disposed on the side of the end of the circuit housing 30 near the auxiliary sidewall 34. The auxiliary sidewall 34 may be another auxiliary sidewall 34 opposite to the auxiliary sidewall 34 where the positioning block 38** is located.

In some embodiments, the first plug section **3*a*2 and the second plug section 3*a*3 may have a stair-step shape along the insertion direction of the plug end 3*a* relative to the socket hole 421 on the side close to the positioning block 38. In a cross-sectional direction perpendicular to the insertion direction, the cross-section of the first plug section 3*a*2 may be larger than the cross-section of the second plug section 3*a*3**.

Correspondingly, the socket hole 421 may further be divided into a first hole section 4211 and a second hole section 4212 whose shapes match the first plug section **3*a*2 and the second plug section 3*a*3 along the insertion direction of the socket end 3*a* relative to the socket hole 421. The plug end 3*a* may be inserted into the socket hole 421. The first plug section 3*a*2 and the second plug section 3*a*3 may be inserted into the first hole section 4211 and the second hole section 4212**, respectively.

In some embodiments, the slot **3*a*1 may be disposed on the first plug section 3*a*2. In some embodiments, the slot 3*a*1 may be extended along the direction from the plug end 3*a* to the positioning block 38. The direction in which the two auxiliary sidewalls 34 of the circuit housing 30 may be opposite to each other. The two sidewalls of the first plug section 3*a*2 perpendicular to the main sidewall 33 of the circuit housing 30 may be penetrated. The two sidewalls of the first plug section 3*a*2 parallel to the main sidewall 33 of the circuit housing 30** may be further penetrated in the vertical insertion direction.

The through hole 423 disposed on the plug end 42 may correspond to the side of the slot **3*a*1 facing the positioning block 38. The through hole 425 may correspond to the side of the slot 3*a*1 away from the positioning block 38**.

In some embodiments, the top sides of the first plug section **3*a*2 and the second plug section 3*a*3 may be coplanar with each other. The top side of the first plug section 3*a*2 and the second plug section 3*a*3 may refer to the side of the first plug section 3*a*2 and the second plug section 3*a*3 facing the top side of the head when the user normally wears the MP3 player. The top side may be a side opposite to the step formed by the first plug section 3*a*2 and the second plug section 3*a*3**.

In some embodiments, the top sides of the first plug section **3*a*2 and the second plug section 3*a*3 may be coplanar and formed a wiring slot 3*a*4 configured to accommodate a wire. The wiring slot 3*a*4 may extend along the insertion direction of the plug end 3*a* and the socket hole 421. The wiring slot 3*a*4 may be configured to accommodate the wires connecting the control circuit 60 and the battery 70 through the rear hook 40. In some embodiments, the plug end 3*a* may be inserted into the socket hole 421. The slot 3*a*1 may be inserted from the side of the first plug section 3*a*2 facing the positioning block 38. In some embodiments, the plug end 3*a* may be disposed on a side of the circuit housing 30 facing the rear hook 40 away from the positioning block 38. Therefore, there may be a certain space on the side of the plug end 3*a* facing the positioning block 38. When the circuit housing 30 and the rear hook 40 are plugged in, the fixing component 88 may be removed from the bottom side of the first plug section 3*a*2. The side of the first plug section 3*a*2 facing the positioning block 38 may be inserted into the slot 3*a*1 through the through-hole 423 and then into the through hole 425, thereby achieving the fixing of the circuit housing 30 and the rear hook 40. In this way, the fixing component 88 may be completely hidden in the internal space formed by the circuit housing 30 and the rear hook 40** without being exposed, thereby eliminating the need to occupy additional space.

In some embodiments, the rear hook 40 may further include a second protective sleeve 43 injection-molded on the periphery of the elastic metal wire 41 and the plug end 42 and an end protection cover 44 integrally formed with the second protective sleeve 43. The material of the second protective sleeve 43 and the end protective cover 44 may be the same as the material of the protective sleeve 16 and the housing protector 17. The material of the protective sleeve 16 and the housing protector 17 may be made of the soft material with a certain elasticity. For example, the material may include the soft silicone, the rubber, or the like, or any combination thereof.

The end protection cover 44 may be formed at both ends of the elastic metal wire 41. The end protection cover 44 may be integrally formed with the plug end 42 located at both ends of the elastic metal wire 41 on the periphery of the plug end 42. It should be noted that the housing protector 17 is only wrapped by the end of the circuit housing 30 facing the ear hook 10 to the annular table 37 of the circuit housing 30. Therefore, the portion of the annular countertop 37 of the circuit housing 30 facing the rear hook 40 may be exposed from the periphery of the housing protector 17. In some embodiments, the shape of the inner sidewall formed by the end protection cover 44 and the plug end 42 may match the shape of the exposed end of the circuit housing 30 to cover the periphery of the end of the exposed the circuit housing 30. The end surface of the end protection cover 44 facing the circuit housing 30 and the end face of the housing protector 17 facing the rear hook 40 may elastically abut, thereby providing the sealing.

It should be noted that the above description of the MP3 player is only for illustration purpose and should not be considered as the only feasible implementation solution. Obviously, for those skilled in the art, after understanding the basic principles of MP3 players, it is possible to make various modifications and changes in the form and details of the specific ways and steps of implementing the MP3 player without departing from this principle, but these modifications and changes are still within the scope described above. For example, the shape of the socket hole 22 may be a ring shape, and the shape of the socket hole 22 may also be an irregular ring shape (e.g., the inner wall of the socket hole 22 is toothed). All such variations are within the protection scope of the present disclosure.

In some embodiments, a loudspeaker apparatus may include a headphone, a MP3 player, a hearing aid, or the like, or any combination thereof. Based on the MP3 player as shown in FIG. 2, in some embodiments, the position of the housing 20 of the earphone core 50 in the MP3 player may not be fixed. The housing 20 of the earphone core 50 may fit different parts of the user's cheek (e.g., in front of the ear, behind the ear, etc.). The user can experience different sound quality. Users may adjust the MP3 player according to their own preferences. It is convenient for users with different head sizes. For example, the MP3 player shown in FIG. 2 may be fixed to the human ear by the ear hook 10, and the housing 20 of the earphone core 50 may be located in front of the ear. In some embodiments, the ear hook 10 may be elastically deformable. The ear hook 10 may be bent to change the fitting position of the housing 20 of the earphone core 50 on the human body. In some embodiments, the ear hook 10 may be configured to connect to the housing 20 of the earphone core 50, and may be set according to the position of the user. For example, the user may be accustomed to placing the housing 20 of the earphone core 50 behind the ear. The connection end of the ear hook 10 may be set behind the ear while maintaining the fixed function of the ear hook 10. Details for the connection way between the ear hook 10 and the housing 20 of the earphone core 50 may be found elsewhere in the present disclosure. It should be noted that the connection way between ear hook 10 and housing 20 of the earphone core 50 may be not limited to the card connection. For example, the ear hook 10 and the housing 20 of the earphone core 50 may also be connected by means of a hinge joint. Details for the hinge may be found elsewhere in the present disclosure.

In some embodiments, the housing 20 of the earphone core 50 may fit on any position of the user's head, for example, the top of the head, forehead, cheeks, horns, auricle, back of auricle, or the like. In some embodiments, the bonding way of the bone conduction headset and the head may be a face fit or a point fit. The bonding surface may be disposed with a gradient structure, which refers to a region where the surface of the contact surface has a high change. The gradient structure may be a convex/concave or stepped structure on the outside of the contact surface (e.g., the side that is in contact with the user), a convex/concave or stepped structure on the inside of the contact surface (e.g., the side facing away from the user), etc.

It should be noted that the above description of housing of the earphone core is only for illustration purposes, and should not be considered as the only feasible implementation solution. Obviously, for a person skilled in the art, after understanding the basic principle of bonding, it is possible to make various modifications and changes in the form and details of the specific ways and steps of implementation without departing from this principle, but these modifications and changes are still within the scope described above. For example, the ear hook may not be limited to the shape in FIG. 2, the shape of the ear hook may be adjusted according to the fitting position of the housing of the earphone core and the human head. All such variations are within the protection scope of the present disclosure.

Figure 16:
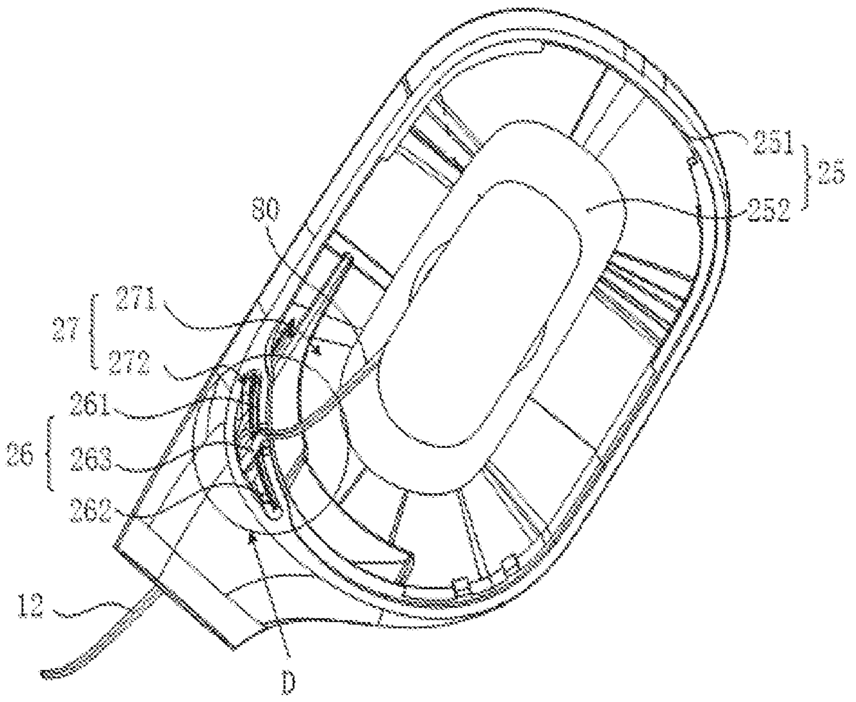
FIG. 16 is a partial structural diagram illustrating a housing of an earphone core of an MP3 player according to some embodiments of the present disclosure.
Figure 17:
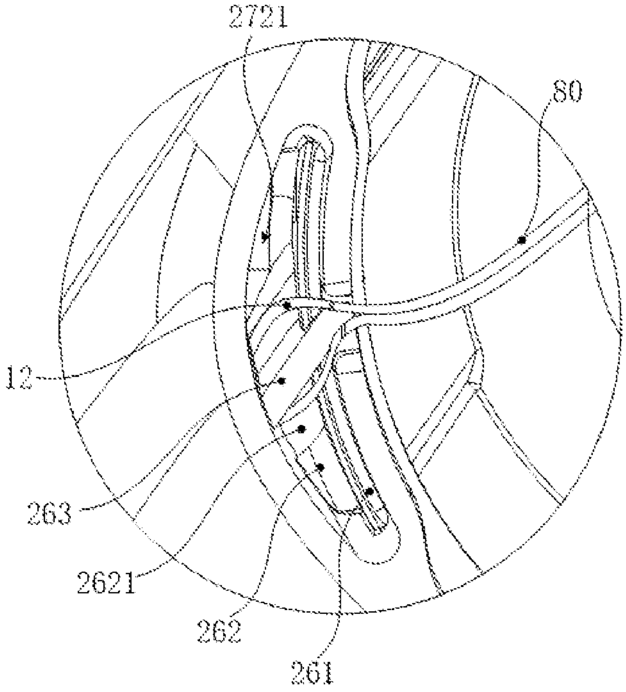
FIG. 17 is a schematic diagram illustrating a partially enlarged view of part D in FIG. 16 according to some embodiments of the present disclosure.
Figure 18:
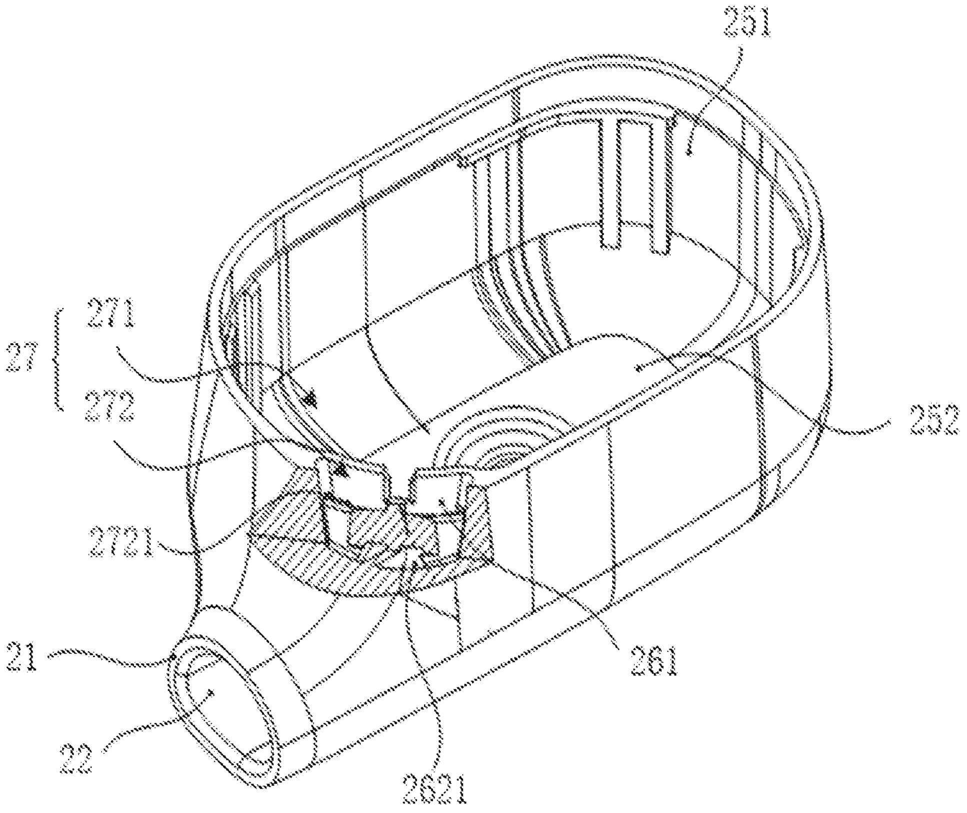
FIG. 18 is a schematic diagram illustrating a partial cross-sectional view of a housing of an earphone core of an MP3 player according to some embodiments of the present disclosure.

FIG. 16 is a partial structural diagram illustrating a housing of an earphone core of an MP3 player according to some embodiments of the present disclosure. FIG. 17 is a schematic diagram illustrating a partial enlarged view of part D in FIG. 16 according to some embodiments of the present disclosure. FIG. 18 is a schematic diagram illustrating a partial cross-sectional view of a housing of an earphone core of an MP3 player according to some embodiments of the present disclosure.

Combining FIG. 16, FIG. 17, and FIG. 18, the housing 20 of the earphone core 50 may include a main housing 25 and a clapboard component 26. The clapboard component 26 may be located inside the main housing 25 connected to the main housing 25. An internal space 27 of the main housing 25 may be divided into a first accommodation space 271 and a second accommodation space 272 near the socket hole 22 side. In some embodiments, the main housing 25 may include a peripheral sidewall 251 and a bottom sidewall 252 connected to one end surface of the peripheral sidewall 251. The peripheral sidewall 251 and the bottom sidewall 252 may collectively surround to form the internal space 27 inside the main housing 25.

In some embodiments, the clapboard component 26 may be located on a side of the main housing 25 near the socket hole 22. The clapboard component 26 may include a side clapboard 261 and a bottom clapboard 262. The side clapboard 261 may be disposed along a direction perpendicular to the bottom sidewall 252. Both ends of the side clapboard 261 may be connected to the peripheral sidewall 251. The internal space 27 of the main housing 25 may be separated. The bottom clapboard 262 may be arranged parallel to or close to the bottom sidewall 252 and spaced apart, and further connected to the peripheral sidewall 251 and the side clapboard 261, respectively. The internal space 27 formed by the main housing 25 may be divided into two parts to form the first accommodation space 271 and the second accommodation space 272. The first accommodation space 271 may be surrounded by a side clapboard 261, a bottom clapboard 262, a peripheral sidewall 251 and a bottom sidewall 252 far from the socket hole 22. The second accommodation space 272 may be surrounded by the bottom clapboard 262 and the side clapboard 261 and the peripheral sidewall 251 near the socket hole 22. The second accommodation space 272 may be less than the first accommodation space 271. In some embodiments, the clapboard component 26 may divide the internal space 27 of the main housing 25 by other setting means.

In some embodiments, the clapboard component 26 may further include an inner clapboard 263. The inner clapboard 263 may separate the second accommodation space 272 into two sub-accommodation spaces 2721. In some embodiments, the inner clapboard 263 may be disposed perpendicular to the bottom sidewall 252 of the main housing 25. The inner clapboard 263 may be connected to the side clapboard 261 and the peripheral sidewall 251, respectively. The inner clapboard 263 may extend to the routing hole 2621. Thus, while the second accommodation space 272 is divided into two sub-accommodation spaces 2721, the routing holes 2621 may be further divided into two. The two routing holes 2621 may communicate with the corresponding sub-accommodation spaces 2721.

In some embodiments, the second accommodation space 272 may be further filled by a sealant. In this way, the lead wires 12 and the lead wires 80 accommodated in the second accommodation space 272 may be further fixed. The adverse effect on the sound quality caused by the lead wire vibration may be reduced. The sound quality of the bone conduction loudspeaker may be improved. The welding point between the lead 12 and the lead 80 may be protected. The sealing of the second accommodation space 272 may be waterproof and dustproof.

It should be noted that the above description of the MP3 player is only for illustration purpose and should not be considered as the only feasible implementation solution. Obviously, for those skilled in the art, after understanding the basic principles of the MP3 players, it is possible to make various modifications and changes in the form and details of the specific ways and steps of implementing the MP3 player without departing from this principle, but these modifications and changes are still within the scope described above. For example, the second accommodation space 272 may also be larger than or the first accommodation space 271. As another example, the second accommodation space 272 may be equal to the first accommodation space 271. All such variations are within the protection scope of the present disclosure.

Figure 19:
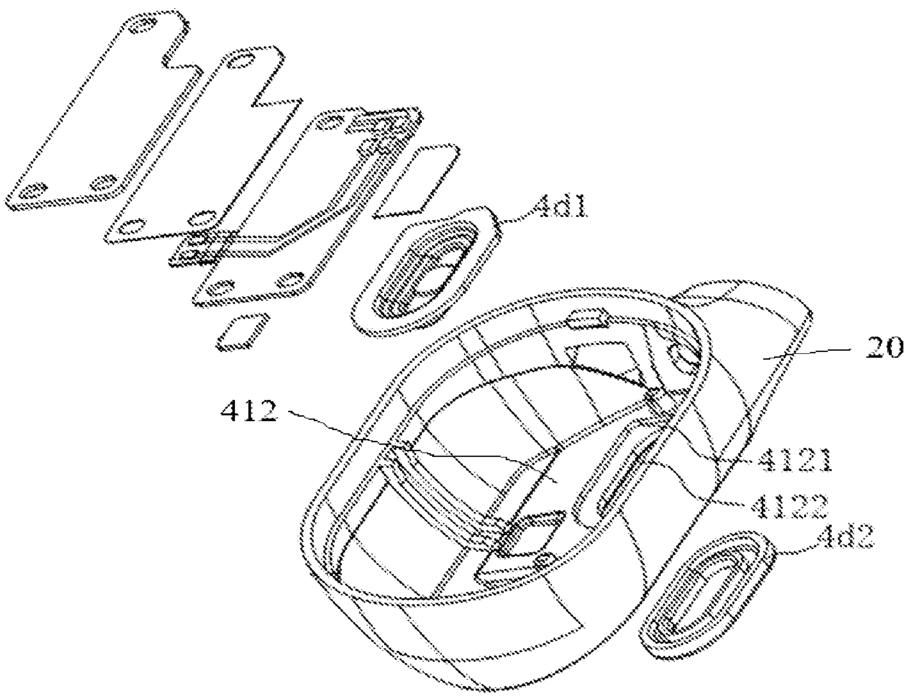
FIG. 19 is a schematic diagram illustrating a partial exploded view of a housing of an earphone core according to some embodiments of the present disclosure.

FIG. 19 is a schematic diagram illustrating a partial exploded view of a housing of an earphone core according to some embodiments of the present disclosure. As shown in FIG. 19, in some embodiments, the inner surface of the bottom sidewall 412 of the housing 20 of the earphone core 50 may be disposed with a recessed area 4121. The recessed area 4121 may be disposed with a keyhole 4122 for communicating the inner surface and the outer surface of the housing 20 of the earphone core 50. The recessed area 4121 may be formed by the inner surface of the housing 20 of the earphone core 50 facing the outer depression of the housing 20 of the earphone core 50. In some embodiments, the keyhole 4122 may be disposed in the middle of the recessed area 4121, or in other parts.

Figure 20:
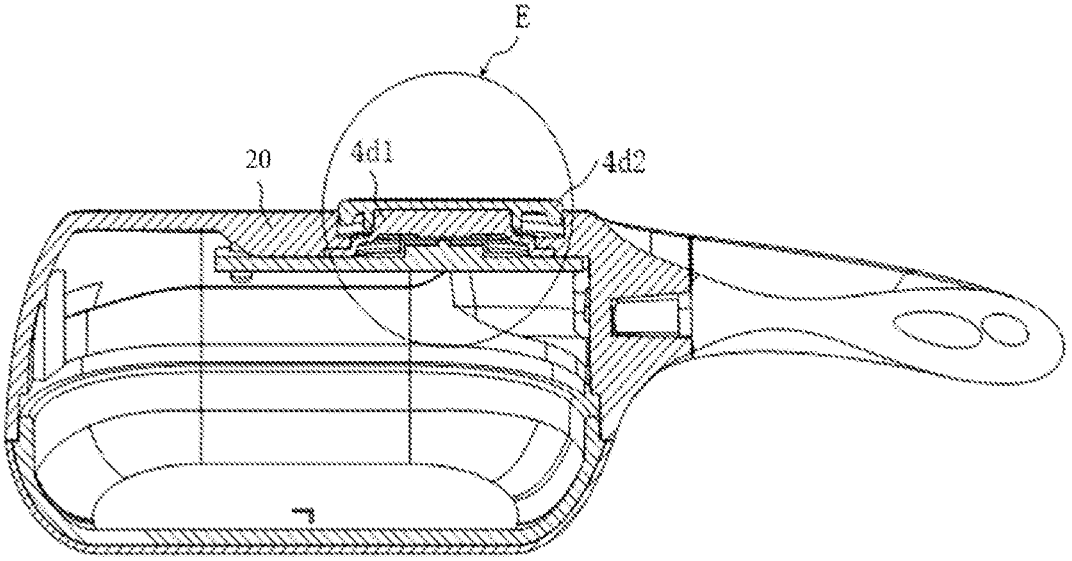
FIG. 20 is a schematic diagram illustrating a partial cross-sectional view of a housing of an earphone core according to some embodiments of the present disclosure.
Figure 21:
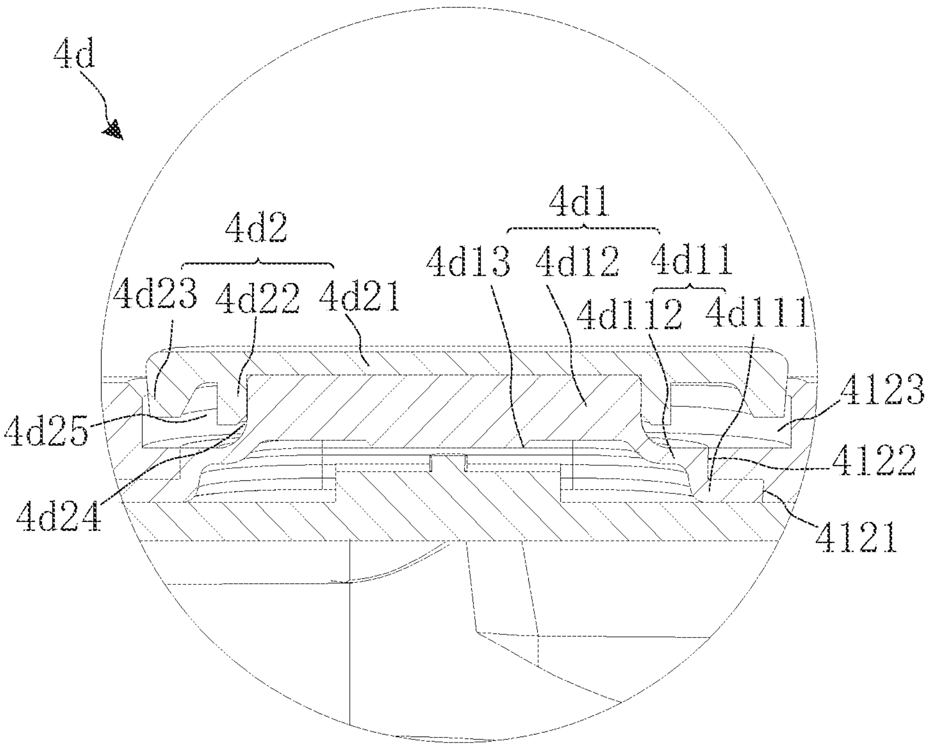
FIG. 21 is a schematic diagram illustrating a partial enlarged view of part E in FIG. 20 according to some embodiments of the present disclosure.

FIG. 20 is a schematic diagram illustrating a partial cross-sectional view of a housing of an earphone core according to some embodiments of the present disclosure. FIG. 21 is a schematic diagram illustrating a partial enlarged view of a part E in FIG. 20 according to some embodiments of the present disclosure. Combining FIG. 20 and FIG. 21, in some embodiments, the MP3 player may further include a key module 4*d*. In some embodiments, the key module 4*d* may include an elastic bearing seat 4*d*1 and a key 4*d*2. In some embodiments, the elastic bearing seat 4*d*1 may include an integrally formed bearing body 4*d*11 and a support pillar 4*d*12. The bearing body 4*d*11 may be disposed in the recessed area 4121 and may be fixed to the bottom of the recessed area 4121. In some embodiments, the bottom of the recessed area 4121 may refer to an inner wall surface of the recessed area 4121 far from the interior of the housing 20 of the earphone core 50. The support pillar 4*d*12 may be disposed on the side of the bearing body 4*d*11 facing the outside of the housing 20 of the earphone core 50 and exposed from the keyhole 4122.

The elastic bearing seat 4*d*1 may be disposed in the recessed area 4121 and fixed to the bottom of the recessed area 4121. The keyhole 4122 may be covered from the inside of the housing 20 of the earphone core 50 through the bearing body 4*d*11 to separate the inside of the housing 20 of the earphone core 50 from the outside. The liquid outside the housing 20 of the earphone core 50 may be difficult to enter into the interior of the housing 20 of the earphone core 50 through the keyhole 4122, thereby protecting the internal components of the housing 20 of the earphone core 50 from water.

In some embodiments, the elastic bearing seat 4*d*1 may be fixed to the bottom of the recessed area 4121 through the bearing body 4*d*11 in an adhesive manner. In some embodiments, the adhesive body and double-sided tape may be applied between the surface of the bearing body 4*d*11 facing the outside of the housing 20 of the earphone core 50 and the bottom of the recessed area 4121 to stick the two together.

In some embodiments, the bearing body 4*d*11 may be fixed to the bottom of the recessed area 4121 by injection molding. The surface of the bearing body 4*d*11 facing the outer side of the housing 20 of the earphone core 50 and the bottom of the recessed area 4121 of the housing 20 of the earphone core 50 may integrally be formed by injection molding (e.g., encapsulation). In some embodiments, the bottom of the recessed area of the housing 20 of the earphone core 50 through the elastic bearing seat 4*d*1 may be integrally formed by injection molding. The combination between the two may be stronger to increase the bonding strength between the two and improve the sealing of the housing 20 of the earphone core 50. The entire key module 4*d* may be made stable and reliable. The waterproof effect of the housing 20 of the earphone core 50 may be further improved.

In some embodiments, the bearing body 4*d*11 may include an annular fixing portion 4*d*111 and an elastic support portion 4*d*112. The annular fixing portion 4*d*111 may be disposed around the keyhole 4122 and fixedly attached to the bottom of the recessed area 4121, thereby fixing the elastic bearing seat 4*d*1 and the housing 20 of the earphone core 50 together.

The elastic support portion 4*d*112 may be connected to the inner ring surface of the annular fixing portion 4*d*111 and faces the exterior of the housing 20 of the earphone core 50 in a dome-shaped bulge. The top to the bottom may have a certain height in the pressing direction of the key 4*d*2. The top may be less than the bottom along a dimension perpendicular to the pressing direction. In some embodiments, the support pillar 4*d*12 may be disposed on the top of the elastic support portion 4*d*112. When the key 4*d*2 is pressed, the top of the elastic support portion 4*d*112 may be pressed to move along a direction close to the bottom thereof, thereby driving the key 4*d*2 to move along the direction of the keyhole 4122 until the switch of the key 431 is triggered.

It should be noted that, because the overall structure of the MP3 player is small and the components are connected more closely, the pressing trip between the key 4*d*2 to the switch of the key 431 may be smaller, thereby weakening the pressing touch of the key 4*d*2. In some embodiments, since the elastic support portion 4*d*112 is dome-shaped bulge toward the outside of the housing 20 of the earphone core 50, the distance between the key 4*d*2 and the switch of the key 431 inside the housing 20 of the earphone core 50 may be increased. The press trip of the switch of the key 431 by the key 4*d*2 may be increase, thereby improving the user's feel of pressing the key 4*d*2.

The bottom of the elastic support portion 4*d*112 may be fixed to the sidewall surface of the keyhole 4122. The top of the elastic support portion 4*d*112 may be exposed from the keyhole 4122. The support pillar 4*d*12 disposed at the end of the elastic support portion 4*d*112 facing the outside of the housing 20 of the earphone core 50 may be completely exposed to the outside of the housing 20 of the earphone core 50, and fixed to the key 4*d*2 outside the housing 20 of the earphone core 50.

In some embodiments, a recessed area 4123 may be disposed on the outer surface of the housing 20 of the earphone core 50. The keyhole 4122 may further be located in the recessed area 4123. The recessed area 4121 and the recessed area 4123 may respectively be located at two ends of the keyhole 4122 and penetrate through the keyhole 4122. In some embodiments, the count of keys 4*d*2 corresponding to the housing 20 of the earphone core 50 may be one, and may correspond to the recessed area 4121 and the recessed area 4123.

In some embodiments, the support pillar 4*d*12 may be supported by the elastic support portion 4*d*112 to the keyhole 4122 facing outside of the housing 20 of the earphone core 50 and located in the recessed area 4123. Further, the key 4*d*2 may be disposed on the elastic support portion 4*d*112 side of the support pillar 4*d*12. In some embodiments, by setting the height of the elastic support portion 4*d*112 and the support pillar 4*d*12 along the pressing direction of the key 4*d*2, the key 4*d*2 may be at least partially sunk in the recessed area 4123 to improve space utilization and reduce the space occupied by the key module 4*d*2.

In some embodiments, the key 4*d*2 may include a key body 4*d*21, and an annular flange 4*d*22 and an annular flange 4*d*23. The annular flange 4*d*22 and the annular flange 4*d*23 may be disposed on one side of the key body 4*d*21. The annular flange 4*d*22 and the annular flange 4*d*23 may be disposed on the opposite side of the pressing surface of the key body 4*d*21.

In some embodiments, the annular flange 4*d*22 may be located in the middle region of the key body 4*d*21. The annular flange **4*d*23 may be located on the outer edge of the key body 4*d*21. The annular flange 4*d*22 and the annular flange 4*d*23 may be convexly formed in a direction away from the pressing surface of the key body 4*d*21. A circular cylindrical accommodation space 4*d*24 may be formed by the annular flange 4*d*22. A circular cylindrical accommodation space 4*d*25 may be formed by the annular flange 4*d*22 and the annular flange 4*d*23. The heights of the annular flange 4*d*22 and the annular flange 4*d*23 with respect to the key body 4*d*21 may be equal or different. In some embodiments, the height of the annular flange 4*d*22 protruding relative to the key body 4*d*21 may be greater than the height of the annular flange 4*d*23 protruding relative to the key body 4*d*21**.

In some embodiments, the support pillar **4*d*12 may be inserted into the inside of the annular flange 4*d*22. The support pillar 4*d*12 may be accommodated in the accommodation space 4*d*24. In some embodiments, the support pillar 4*d*12 may be fixed to the annular flange 4*d*22** by means of bonding, injection-molded, or elastic contact.

In some embodiments, the end face of the annular flange **4*d*23, which is away from the key body 4*d*21, may be sunk in the recessed area 4123. The end face of the annular flange 4*d*23 may be spaced a certain distance from the bottom of the recessed area 4123 when the elastic bearing seat 4*d*1** is in a normal state.

In some embodiments, the bottom of the recessed area 4123 may refer to the inner wall surface of the recessed area 4123 facing the inside of the housing 20 of the earphone core 50. In some embodiments, when the elastic bearing seat **4*d*1 is in a normal state, by pressing the pressing surface of the key 4*d*2, the top of the elastic support portion 4*d*112 of the elastic bearing seat 4*d*1 may move along a direction toward the housing 20 of the earphone core 50 and trigger the switch of the key 431 before the end face of the annular flange 4*d*23 away from the key body 4*d*21 contacts the bottom of the recessed area 4123**.

In some embodiments, the elastic bearing seat **4*d*1 may further include a contact head 4*d*13 for contacting the switch of the key 431. The contact head 4*d*13 may be disposed on the bearing body 4*d*11 on the inner side of the housing 20 of the earphone core 50. In some embodiments, the elastic support portion 4*d*112 may be disposed on the top of the middle region of the inner wall surface facing the interior of the housing 20 of the earphone core 50, and the convex portion may be provided toward the interior of the housing 20 of the earphone core 50** relative to the inner wall surface.

It should be noted that the above description of the MP3 player is only for illustration purpose and should not be considered as the only feasible implementation solution. Obviously, for those skilled in the art, after understanding the basic principles of MP3 players, it is possible to make various modifications and changes in the form and details of the specific ways and steps of implementing the MP3 player without departing from this principle, but these modifications and changes are still within the scope described above. For example, the shapes and/or the sizes of the recessed area 4121 and the recessed area 4123 may be the same or different according to different application scenarios. As another example, the count of the recessed area 4121 and the recessed area 4123 may be the same. As still another example, the count of the recessed area 4121 and the recessed area 4123 may be determined by the count of the keys **4*d*2. For example, the count of the recessed area 4121 and/or the recessed area 4123 may be one or more. One or a plurality of keyhole 4122 may be disposed in each of the recessed area 4121 and the recessed area 4123** correspondingly. All such variations are within the protection scope of the present disclosure.

Figure 22:
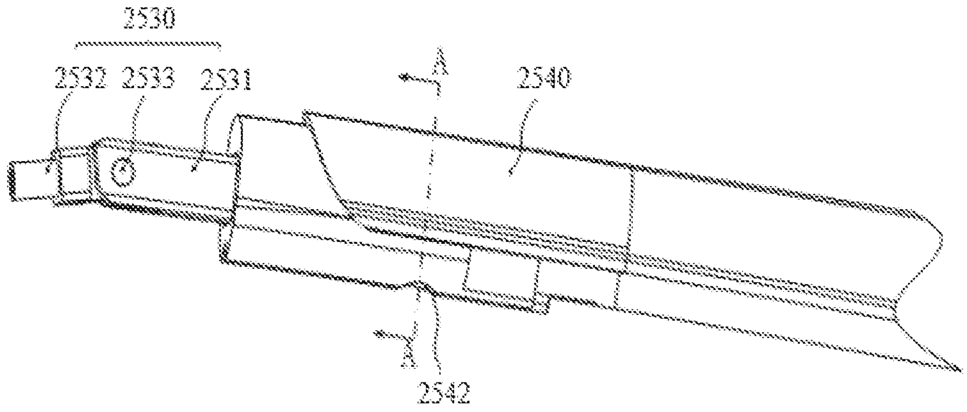
FIG. 22 is a schematic structural diagram illustrating a hinge component according to some embodiments of the present disclosure.
Figure 23:
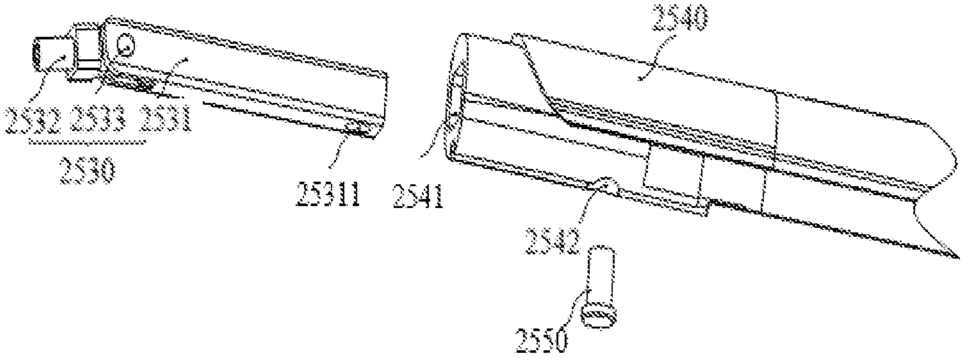
FIG. 23 is a schematic diagram illustrating an exploded view of a hinge component according to some embodiments of the present disclosure.

FIG. 22 is a schematic structural diagram illustrating a hinge component according to some embodiments of the present disclosure. FIG. 23 is a schematic diagram illustrating an exploded view of the hinge component according to some embodiments of the present disclosure. As shown in FIG. 22 and FIG. 23, the hinge component may include a hinge 2530, which is a structure used to connect two solid bodies and allow relative rotation between them. In some embodiments, the connection between the ear hook 10 and the housing 20 of the earphone core 50 may also be performed by means of the hinge joint, and the fitting position of the housing 20 of the earphone core 50 (i.e., loudspeaker component) and the human skin may be adjusted through the hinge component.

Combining FIG. 2, FIG. 22 and FIG. 23, the hinge component may be disposed at an end of the ear hook 10 away from the circuit housing 30. The hinge component may connect with the housing 20 of the earphone core 50 to the end of the ear hook 10 away from the circuit housing 30 through the hinge 2530. In some embodiments, the hinge component may include a rod-like component 2540 and a fixing component 2550. In some embodiments, the hinge 2530 may include a hinge base 2531 and a hinge arm 2532. The hinge arm 2532 may be rotatably connected to the hinge base 2531 through a rotation shaft 2533. The hinge base 2531 and the hinge arm 2532 may be respectively connected to two components that need to be rotationally connected. The two components may be rotationally connected together through the rotation shaft 2533 of the hinge 2530. For example, the hinge base 2531 may be fixedly connected to the ear hook 10. As another example, the hinge arm 2532 may be connected to the housing 20 of the earphone core 50.

In some embodiments, the hinge base 2531 of the hinge 2530 may be connected to the rod-like component 2540. In some embodiments, the rod-like component 2540 may be a partial structure or an overall structure of one of the two members rotationally connected through the hinge 2530. In some embodiments, the rod-like component 2540 may be a connection structure in which one of the two members requiring rotational connection is connected to the hinge 2530. When the hinge component is used in an MP3 player, the rod-like component 2540 may be at least a part of the ear hook 10 of the MP3 player. For example, the rod-like component 2540 may be all of the ear hook 10. As another example, the rod-like component 2540 may be part of the end of the ear hook 10 away from the circuit housing 30. In some embodiments, the hinge 2530 may be set at the end of the ear hook away from the circuit housing 30 through the part of the ear hook 10.

In some embodiments, the rod-like component 2540 may be disposed along the length direction with a hinge cavity 2541 communicating with the end surface of the rod-like component 2540. A sidewall of the rod-like component 2540 may be disposed with a first insertion hole 2542 communicating with the hinge cavity 2541. The end of the hinge base 2531 away from the hinge arm 2532 may be inserted into the hinge cavity 2541 from the end surface of the rod-like component 2540, and may be fixed in the hinge cavity 2541 by the fixing component 2550 inserted in the first insertion hole 2542. In some embodiments, the hinge cavity 2541 may communicate with the ear hook 10 away from the end face of the end of the circuit housing 30. The hinge base 2531 may be inserted into the hinge cavity 2541. The hinge 2530 may be connected to the ear hook 10.

In some embodiments, the first insertion hole 2542 may be formed by the rod-like component 2540 during the molding process, or may be formed on the sidewall of the rod-shaped member by a mean such as drilling after the molding. In some embodiments, the shape of the first insertion hole 2542 may be circular. In some embodiments, the shape of the first insertion hole 2542 may be other shapes (e.g., a square, a triangle, etc.). The shape of the fixing component 2550 may match the shape of the first insertion hole 2542. The fixing component 2550 may be inserted into the first insertion hole 2542 from the outside of the rod-like component 2540. The hinge base 2531 may be fixed in the hinge cavity 2541 by abutting the sidewall of the hinge base 2531. In some embodiments, the hinge base 2531 may be fixed in the hinge cavity 2541 by penetrating and inserting into the outer wall of the hinge base 2531. In some embodiments, a matching thread may be disposed on the inner wall of the first insertion hole 2542 and the outer wall of the fixing component 2550 The fixing component 2550 may be connected to the first insertion hole 2542 by screwing to further fix the hinge base 2531 in the hinge cavity 2541. In some embodiments, the first insertion hole 2542 and the fixing component 2550 may be connected by an interference fit.

In some embodiments, the hinge arm 2532 may be connected with other components. After connecting with the hinge arm 2532, the component may be further able to rotate around the rotation shaft 2533 by being mounted in the hinge cavity 2541 of the rod-like component 2540 with the hinge base 2531 or other components connected with the rod-like component 2540. For example, when the hinge component is used in the MP3 player, the housing 20 of the earphone core 50 may be connected to the end of the hinge arm 2532 away from the hinge base 2531. The housing 20 of the earphone core 50 may be connected to the end of the ear hook 10 away from the circuit housing 30 through the hinge 2530.

In some embodiments, the rod-like component 2540 may be disposed with the hinge cavity 2541 connected to an end surface of the rod-like component 2540. The hinge 2530 may accommodate the hinge seat 252531 in the hinge cavity 41, and further penetrate the fixing component 2550 through the sidewall of the rod-like component 2540 through the first insertion hole 2542, thereby fixing the hinge base 2531 accommodated in the hinge cavity 2541 in the hinge cavity 2541. The hinge 2530 may be detached from the rod-like component 2540 to facilitate replacement of the hinge 2530 or the rod-like component 2540. In some embodiments, the hinge 2530 and the housing 20 of the earphone core 50 of the MP3 player may be detachable relative to the ear hook 10, thereby facilitating replacement when the housing 20 of the earphone core 50 or the ear hook 10 is damaged.

In some embodiments, the hinge base 2531 may be disposed with a second insertion hole 25311 corresponding to the first insertion hole 2542. The fixing component 2550 may be further inserted into the second insertion hole 25311. In some embodiments, the shape of the second insertion hole 25311 may match the shape of the fixing component 2550. The fixing component 2550 may be inserted into the second insertion hole 25311 to fix the hinge seat 2531 after passing through the first insertion hole 2542. The shaking of the hinge base 2531 in the hinge cavity 2541 may be reduced, and the hinge 2530 may be fixed more firmly. In some embodiments, the inner wall of the second insertion hole 25311 may be disposed with matching threads on the outer wall corresponding to the fixing component 2550. The fixing component 2550 and the hinge base 2531 may be screwed together. In some embodiments, the inner wall of the second insertion hole 25311 and the outer sidewall at the corresponding contact positions of the fixing component 2550 may be smooth surfaces. The fixing component 2550 and the second insertion hole 25311 may be in interference fit. In some embodiments, the second insertion hole 25311 may be disposed through both sides of the hinge base 2531. The fixing component 2550 may further penetrate the entire hinge base 2531. The hinge base 2531 may be firmly fixed in the hinge cavity 2541.

In some embodiments, the cross-sectional shape of the hinge base 2531 may match the cross-sectional shape of the hinge cavity 2541 in a cross section perpendicular to the length direction of the rod-like component 2540. A seal may be formed between the hinge base 2531 and the rod-like component 2540 after insertion. In some embodiments, the cross-sectional shape of the hinge base 2531 and the cross-sectional shape of the hinge cavity 2541 may be any shapes, as long as the hinge base 2531 may be inserted into the hinge cavity 2541 from the end of the rod-like component 2540 away from the hinge arm 2532. In some embodiments, the first insertion hole 2542 may be disposed on the sidewall of the hinge cavity 2541, and penetrate the sidewall of the hinge cavity 2541 and communicates with the hinge cavity 2541.

In some embodiments, the cross-sectional shape of the hinge base 2531 and the cross-sectional shape of the hinge cavity 2541 may be both rectangular. The first insertion hole 2542 may be perpendicular to one side of the rectangle. In some embodiments, the corners of the outer wall of the hinge base 2531 or the corners of the inner wall of the hinge cavity 2541 may be rounded. The contact between the hinge base 2531 and the hinge cavity 2541 may be smooth. The hinge base 31 may be smoothly inserted into the hinge cavity 2541.

In some embodiments, the hinge component may include a connection line provided outside the hinge 2530. In some embodiments, the connection line may be a connection line having an electrical connection function and/or a mechanical connection function. The hinge component may be configured to connect the end of housing 20 of the earphone core 50 and the ear hook 10 away from the circuit housing 30. The control circuit or the like related to the housing 20 of the earphone core 50 may be disposed in the ear hook 10 or the circuit housing 30. The connecting wire 2560 may electrically connect a housing 20 of the earphone core 50 with a control circuit in the ear hook 10 or the circuit housing 30. In some embodiments, the connecting wire 2560 may be located at one side of the hinge base 2531 and the hinge arm 2532. The hinge 2530 may be disposed in the same accommodation space.

In some embodiments, the hinge base 2531 may include a first end surface. The hinge arm 2532 may have a second end surface opposite to the first end surface. It is easily understood that there is a certain gap between the first end surface and the second end surface, so that the hinge base 2531 and the hinge arm 2532 may be relatively rotated around the rotation shaft 2533. In some embodiments, during the relative rotation of the hinge arm 2532 and the hinge base 2531, the relative position between the first end surface and the second end surface changes accordingly, so that the gap between the two becomes larger or smaller.

In some embodiments, the gap between the first end surface and the second end surface may be always larger than or less than the diameter of the connecting wire 2560. The connecting wire 2560 located outside the hinge 2530 may not be caught in the gap between the first end surface and the second end surface during the relative rotation of the hinge base 2531 and the hinge arm 2532, thereby reducing the damage of the connecting wire 2560 by the hinge. In some embodiments, the ratio of the gap between the first end surface and the second end surface to the diameter of the connection line during the relative rotation of the hinge arm 2532 and the hinge base 2531 may always be greater than 1.5 (e.g. greater than 1.5, 1.7, 1.9, 2.0, etc.) or less than 0.8 (e.g., less than 0.8, 0.6, 0.4, 0.2, etc.).

Figure 24:
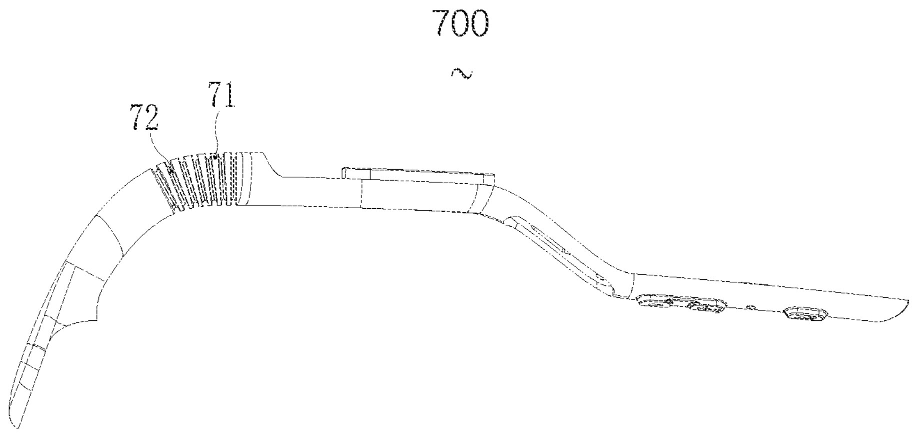
FIG. 24 is a schematic structural diagram illustrating a hinge component according to some embodiments of the present disclosure.
Figure 25:
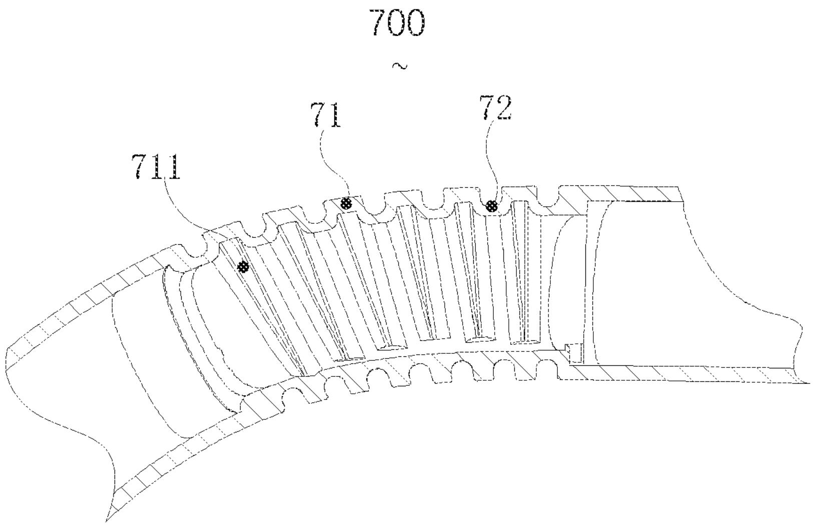
FIG. 25 is a schematic diagram illustrating a partial cross-sectional view of a hinge component according to some embodiments of the present disclosure.

FIG. 24 is a schematic structural diagram illustrating a hinge component according to some embodiments of the present disclosure. FIG. 25 is a schematic diagram illustrating a partial cross-sectional view of the hinge component according to some embodiments of the present disclosure. As shown in FIG. 24 and FIG. 25, in some embodiments, the hinge component may further include a protective sleeve 700. The protective sleeve 700 may be sleeved on the periphery of the hinge 2530 and may be bent along with the hinge 2530. In some embodiments, the protective sleeve 700 may include a plurality of annular ridge portions 71 spaced apart along the length direction of the protective sleeve 700 and an annular connection portion 72 provided between the annular ridge portions 71. The protective sleeve 700 may be used to connect two adjacent annular ridge portions. In some embodiments, the tube wall thickness of the annular ridge portion 71 may be greater than the tube wall thickness of the annular connection portion 72. The length direction of the protective sleeve 700 may be consistent with the length direction of the hinge 2530. The protection sleeve 70 may be specifically disposed along the length direction of the hinge base 2531 and the hinge arm 2532. The protective sleeve 700 may be made of the soft material. For example, the material may include the soft silicone, the rubber, or the like, or any combination thereof.

In some embodiments, the annular ridge portion 71 may be formed by protruding outwardly from the outer sidewall of the protective sleeve 700. The shape of the inner sidewall of the protective sleeve 700 corresponding to the annular ridge portion 71 may be not limited herein. For example, the surface of inner wall may be smooth. As another example, a recess on the inner wall may be disposed at a position corresponding to the annular ridge portion 71. The annular connection portion 72 may be configured to connect adjacent annular ridge portions 71, specifically connected to the edge region of the annular ridge portion 71 near the inside of the protective sleeve 700. A side of the outer wall of the protective sleeve 700 may be disposed in a recess with respect to the annular ridge portion 71.

When the hinge base 2531 and the hinge arm 2532 of the hinge 2530 are relatively rotated around the rotation shaft 2533, the angle between the hinge base 2531 and the hinge arm 2532 may change. The protective sleeve 700 may be bent. In some embodiments, when the protective sleeve 700 is bent with the hinge 2530, the annular ridge 71 and the annular connection portion 72 located in the outer region of the bent shape formed by the protective sleeve 700 may be in a stretched state. The annular ridge 71 and annular connection portion 72 located in the inner region of the bent shape may be in a squeezed state.

The tube wall thicknesses of the annular ridge portion 71 and the annular connection portion 72 may refer to the thickness between the inner and outer walls of the protective sleeve 700 corresponding to the annular ridge portion 71 and the annular connection portion 72, respectively. In some embodiments, the thickness of the pipe wall of the annular ridge portion 71 may be greater than the thickness of the pipe wall of the annular connection portion 72. The annular ridge portion 71 may be harder than the annular connection portion 72. Therefore, when the protective sleeve 700 is in a bent state, the protective sleeve 700 on the outer side of the bent shape may be in a stretched state. The annular ridge portion 71 may provide a certain strength support for the protective sleeve 700. When the protective sleeve 700 region on the inner side in the bent state is squeezed, the annular ridge portion 71 may withstand a certain pressing force, thereby protecting the protective sleeve 700 and improving the stability of the protective sleeve 700. The life of the protective sleeve 700 may be extended.

In some embodiments, the shape of the protective sleeve 700 may be consistent with the state of the hinge 2530. In some embodiments, two sides of the protective sleeve 700 along the length direction and rotated around the rotation axis may be stretched or squeezed. In some embodiments, the hinge base 2531 and the hinge arm 2532 of the hinge 2530 may only rotate around the rotation shaft 2533 within a range of less than or equal to 180°. The protective sleeve 700 may only be bent toward one side, then one side of the two sides of the protective sleeve 700 in the length direction may be squeezed. The other side may be stretched. At this time, according to the different forces on both sides of the protective sleeve 700, the two sides of the protective sleeve 700 under different forces may have different structures.

In some embodiments, the width of the annular ridge portion 71 along the length direction of the protective sleeve 700 when the protective sleeve 700 is in a bent state toward the outside of the bent shape formed by the protective sleeve 700 may be greater than the width in the longitudinal direction of the protective sleeve 700 toward the inside of the bent shape. Increasing the width of the annular ridge 71 in the length direction of the protective sleeve 700 may further increase the strength of the protective sleeve. In some embodiments, the angle of the initial angle between the hinge base 2531 and the hinge arm 2532 may be less than 180°. If the annular ridges 71 of the protective sleeve 700 are evenly arranged, the protective sleeve 700 will be squeezed in the original state. In some embodiments, the width of the annular ridge 71 corresponding to the outer region side of the bent shape in the bent state is larger, thereby enlarging the length of the side protective sleeve 700. The strength of the protective sleeve 700 may be improved. The extent of the stretching side may be reduced when the protective sleeve 700 is bent. At the same time, the width of the annular ridge portion 71 along the longitudinal direction of the protective sleeve 700 may be smaller when the protective sleeve 700 is in a bent state toward the inner region side of the bent shape, which can increase the space of the extruded annular connection portion 72 in the length direction of the protective sleeve 700 and alleviate the extrusion of the extrusion side.

In some embodiments, the width of the annular ridge portion 71 may gradually decrease from the side of the outer region toward the bent shape to the side of the inner region toward the bent shape. When the protective sleeve 700 is in the bent state, the width toward the outer region side of the bent shape formed by the protective sleeve 700 may be greater than the width toward the inner region side of the bent shape. The annular ridge portion 71 may be disposed around the periphery of the protective sleeve 700. In the length direction of the protective sleeve 700, one side corresponds to the stretched side, and the other side corresponds to the squeezed side. In some embodiments, the width of the annular ridge portion 71 may gradually decrease from the side of the outer region facing the bent shape to the side of the inner region facing the bent shape, thereby making the width more uniform. The stability of the protective sleeve 700 may be improved.

In some embodiments, when the protective sleeve 700 is in a bent state, the annular ridge portion 71 may be disposed with a groove 711 on an inner circumferential surface of the protective sleeve 700 inside the protective sleeve 700 on the outer region side of the bent shape formed by the protective sleeve 700. The groove 711 may be disposed along a length direction perpendicular to the protective sleeve 700. The corresponding annular ridge portion 71 may be appropriately extended when the protective sleeve 700 is stretched in the length direction. When the protective sleeve 700 is in a bent state, the protective sleeve 700 on the outer side of the bent shape formed by the protective sleeve 700 may be in a stretched state. A groove 711 may be disposed on the inner ring surface inside the protective sleeve 700 corresponding to the corresponding annular ridge portion 71, so that when the side protective sleeve is stretched, the annular ridge portion 71 corresponding to the groove 711 may be appropriately extended to bear a partial stretch, thus reducing the tensile force experienced by the side protective sleeve, thereby protecting the protective sleeve 700.

It should be noted that when the protective sleeve 700 is in a bent state, the annular ridge portion 71 on the side facing the inner region of the bent shape may not be disposed with a groove 711 on the inner sidewall of the corresponding protective sleeve 700. In some embodiments, the width of the groove 711 along the length of the protective sleeve 700 gradually decreases from the side of the outer region facing the bent shape to the side of the inner region facing the bent shape, so that no groove 711 is disposed on the inner sidewall of the protective sleeve 700 corresponding to the annular ridge portion 71 facing the inner region side of the bent shape.

In some embodiments, when the hinge component is applied to an MP3 player (shown in FIG. 2) of the loudspeaker apparatus of the present disclosure, the protective sleeve 700 may be connected to the ear hook 10 and the housing 20 of the earphone core 50 which are respectively disposed on both sides in the longitudinal direction of the protective sleeve 700. In some embodiments, the protective sleeve 700 may also be other structures in the MP3 player. For example, the protective cover of some components may be integrally formed, so that the MP3 player may be more closed and integrated.

It should be noted that the hinge component in the present disclosure embodiment may not only be used in the MP3 player of the loudspeaker apparatus, but may also be used in other apparatuses, such as glasses, the headphone, and the hearing aid. In some embodiments, the hinge component may also include the rod-like component 2540, the fixing component 2550, the connecting wire 2560, the protective sleeve 700, etc., or other components related to the hinge 2530. The hinge component may realize the corresponding functions of the other components.

It should be noted that the above description of the MP3 player is only for illustration purpose and should not be considered as the only feasible implementation solution. Obviously, for those skilled in the art, after understanding the basic principles of the MP3 player, is possible to make various modifications and changes in the form and details of the specific ways and steps of implementing the MP3 player without departing from this principle, but these modifications and changes are still within the scope described above. For example, the count of the annular ridges 71 and the annular connection portions 72 may be not limited to those shown in the figure, and the count may be determined according to different application scenarios. As another example, the count of the annular ridges 71 and the annular connection portions 72 may be determined based on the length of the protective sleeve 700, the width of the annular ridge portion 71 and the annular connection portion 72 in the longitudinal direction of the protective sleeve 700. All such variations are within the protection scope of the present disclosure.

Figure 26:
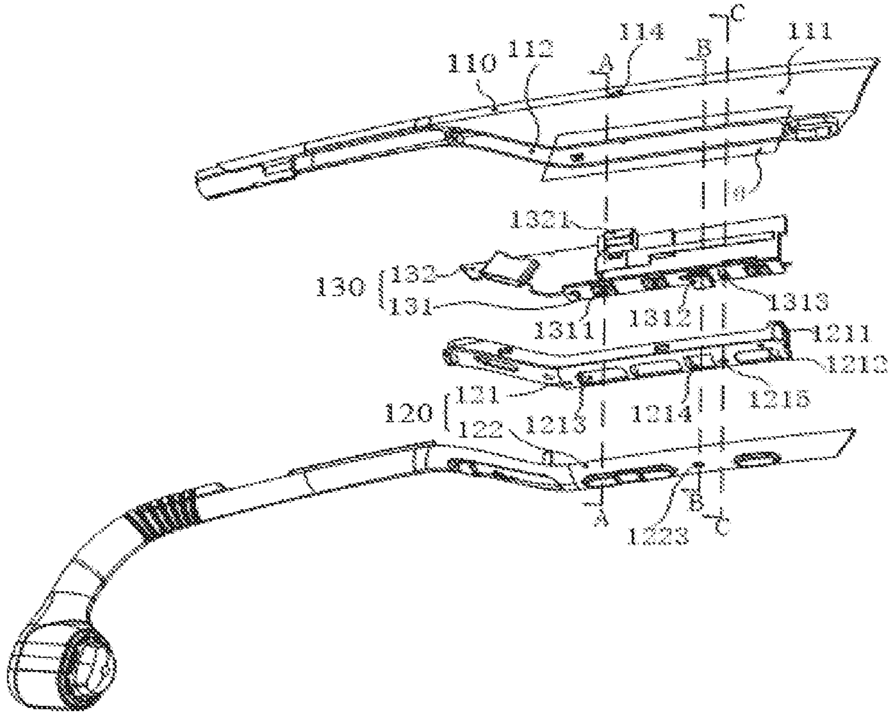
FIG. 26 is a schematic diagram illustrating an exploded structural view of an electronic component according to some embodiments of the present disclosure.
Figure 27:
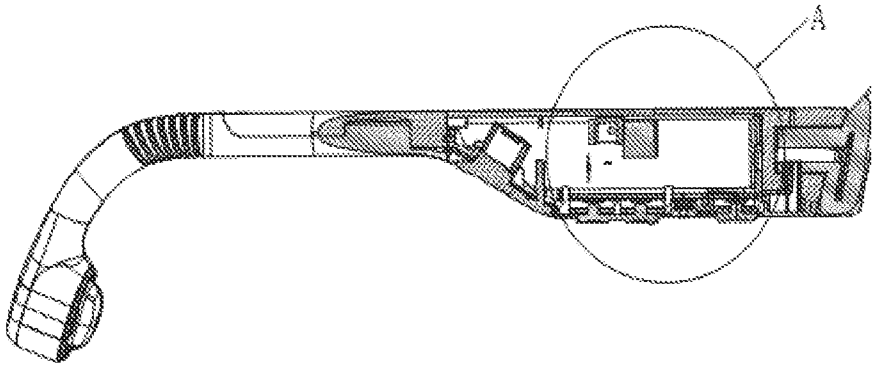
FIG. 27 is a schematic diagram illustrating a partial cross-sectional view of an electronic component according to some embodiments of the present disclosure.
Figure 28:
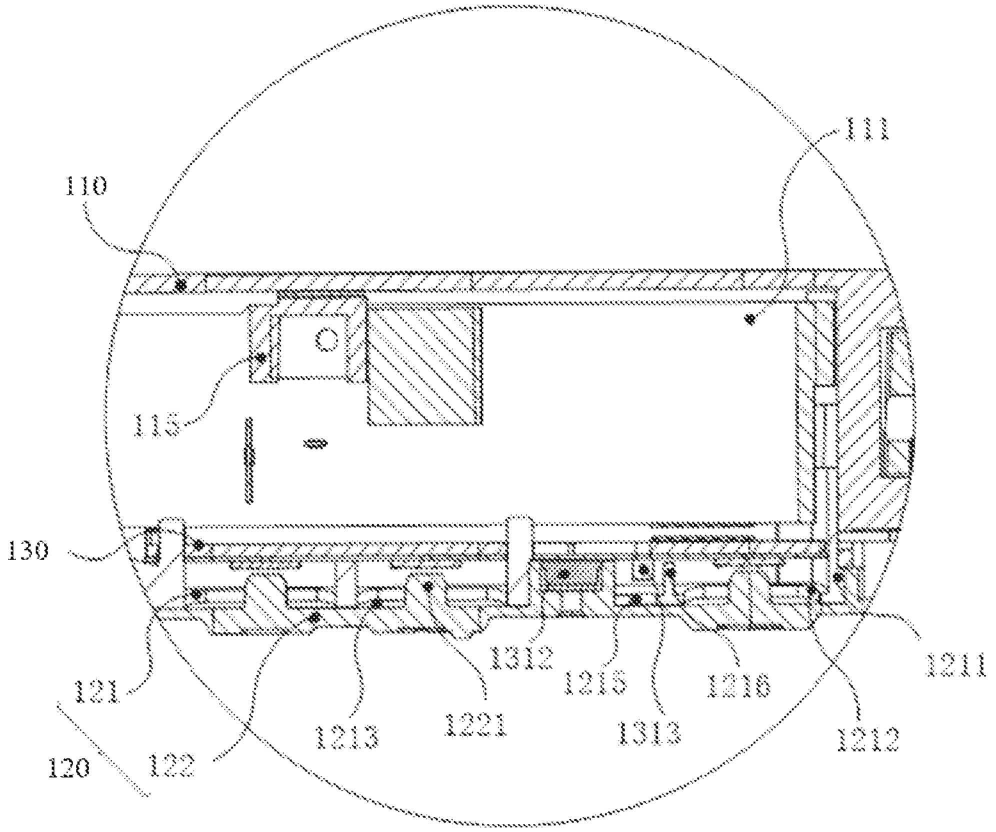
FIG. 28 is a schematic diagram illustrating an enlarged view of part A in FIG. 27 according to some embodiments of the present disclosure.

FIG. 26 is a schematic diagram illustrating an exploded structural view of an electronic component according to some embodiments of the present disclosure. FIG. 27 is a schematic diagram illustrating a partial cross-sectional view of an electronic component according to some embodiments of the present disclosure. FIG. 28 is a schematic diagram illustrating an enlarged view of part A in FIG. 27 according to some embodiments of the present disclosure. The electronic components in the present disclosure may be applied to electronic devices. The electronic devices may be any electronic device that needs to seal the internal structure, such as the earphone, the MP3 player, the hearing aid, a mobile phone, a tablet computer, or glasses with circuit components and electronic devices, or the like, or any combination thereof. In some embodiments, the electronic component may include the circuit housing 30 in FIG. 2 and its internal circuits. The electronic components may also be called the circuit housing 30.

Combining FIG. 26, FIG. 27, and FIG. 28, in some embodiments, the electronic component (i.e., the circuit housing 30) may include an accommodation body 110 and a cover body 120. The accommodation body 110 may be disposed with a cavity 111 having at least one opening 112. The cover body 120 may be covered on the opening 112 of the cavity 111, and may be used to seal the cavity 111.

In some embodiments, the accommodation body 110 may be at least part of the electronic devices. The accommodation body 110 may be a structure for holding. For example, the accommodation body 110 may be a circuit board, a battery, and electronic components in an electronic device. As another example, the accommodation body 110 may be the whole of the ear hook of the MP3 player or a part of the ear hook of the MP3 player. In some embodiments, the accommodation body 110 may be disposed with the cavity 111 having the opening 112 for containing the circuit board, battery, and electronic components.

The shape of the cover body 120 may at least partially match the shape of the opening 112. The cover body 120 may be placed on the opening 112 to seal the cavity 111. The material of the cover body 120 may be different from or partially the same as the material of the accommodation body 110. In some embodiments, the cover body 120 may include a hard support 121 and a soft cover layer 122. The support 121 may be used for physical connection with the accommodation body 110. The soft cover layer 122 may be integrally injection-molded on the surface of the support 121 to provide a seal for the cavity 111 after the support 121 is connected to the accommodation body 110.

In some embodiments, the material of the support 121 may be a hard plastic. The material of the soft cover layer 122 may be the soft silicone or the rubber. The shape of the side of the support 121 facing the accommodation body 110 may match the shape of the opening 112. The support 121 may be fixed to the opening 112 of the cavity 111 by means of inserting, buckling, etc. The support 121 may be physically connected with the accommodation body 110. The hard support 121 may be easily to form a gap at the physical connection of the accommodation body 11 and reduces the sealing of the cavity 111. In some embodiments, the soft cover layer 122 may be integrally injection-molded and formed on the outer surface of the support 121 away from the accommodation body 110. The soft cover layer 122 may further cover the connection between the support 121 and the accommodation body 11, thereby achieving the seal of the cavity 111.

In some embodiments, the cover body 120 may include the hard support 121 and the soft cover layer 122 integrally injection-molded on the surface of the hard support 121. The support 121 may be physically connected to the accommodation body 110. The soft cover layer 122 may further provide a seal for the cavity 111 after the support 121 is connected to the accommodation body 11. The soft cover layer 122 may be more conducive to fit the gap between the support 121 and the accommodation body 110. The sealing performance of the electronic component and the waterproof effect of the electronic component may be improved. At the same time, the support 121 and the soft cover layer 122 may be integrally injection-molded. The assembly process of electronic components may be simplified.

In some embodiments, the support 121 may include an insertion portion 1211 and a covering portion 1212. The covering portion 1212 may be covered on the opening 112. The insertion portion 1211 may be disposed on one side of the covering portion 1212 and may extend into the cavity 111 along the inner wall of the cavity 111 to fix the covering portion 1212 on the opening 112.

In some embodiments, the insertion portion 1211 may not be inserted through the inner wall of the cavity 111. For example, the inside of the cavity 111 may further be disposed with a plug portion that matches the shape of the insertion portion 1211 of the support 121. The insertion portion 1211 may be engaged with the plug portion, and the plug portion may be fixed inside the cavity 111. For example, the shape of the insertion portion 1211 may be a cylinder. The plug portion may be a cylindrical ring that can surround the cylindrical plug portion. The inner diameter of the plug portion of the cylindrical ring may be appropriately less than the outer diameter of the plug portion of the cylindrical body. When the insertion portion 1211 is inserted into the plug portion, the interference fit with the plug portion may cause the support 121 to be stably connected to the cavity 111. In some embodiments, other insertion ways may also be used, as long as the insertion portion 1211 may be inserted into the cavity 111 and fixed to the cavity 111.

The covering portion 1212 may be disposed on a side of the insertion portion 1211 facing away from the cavity 111, and may cover the opening 112 after the insertion portion 1211 is inserted into the cavity 111. The covering portion 1212 may be a complete structure, or may be further disposed with some holes according to needs, so as to achieve a certain function.

Figure 32:
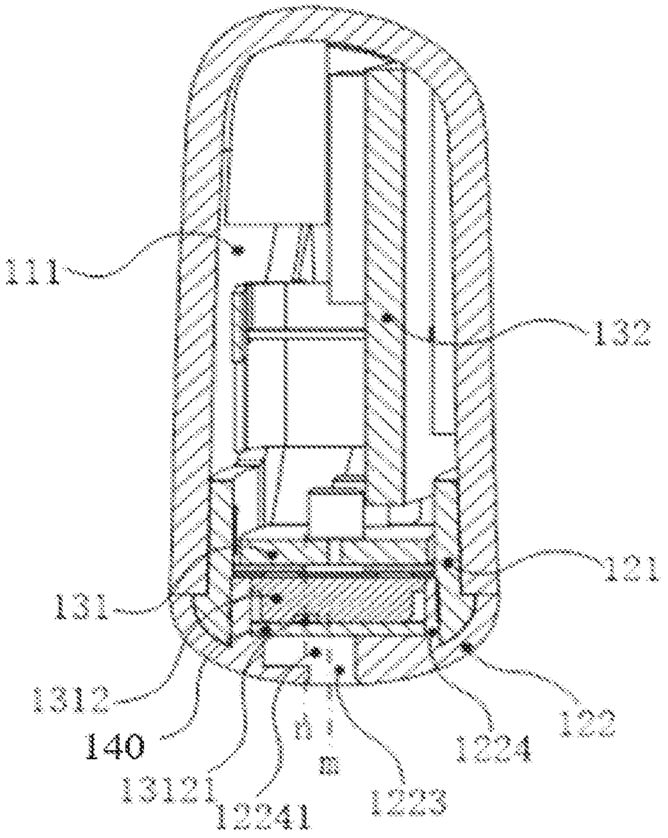
FIG. 32 is a schematic diagram illustrating a cross-sectional view of an electronic component under a combined state along B-B axis in FIG. 26 according to some embodiments of the present disclosure.

FIG. 32 is a schematic diagram illustrating a cross-sectional view of an electronic component under an assembled state along A-A axis in FIG. 26 according to some embodiments of the present disclosure. As shown in FIG. 32, in some embodiments, the accommodation body 110 may include an opening edge 113 for defining the opening 112. The covering portion 1212 may be pressed against the inner region 1131 of the opening edge 113 near the opening 112. The soft cover layer 122 may cover the outer surface of the covering portion 1212 away from the accommodation body 110 and may be pressed on the outer region 1132 where is the periphery of the inner region 1131 of the opening edge 113, thereby achieving a seal between the opening edge 113.

The inner region 1131 and the outer region 1132 of the opening edge 113 both belong to the opening edge 113, rather than other regions out of the opening edge 113. The inner region 1131 of the opening edge 113 may be a region of the opening edge 113 close to the opening 112. The outer region 1132 of the opening edge 113 may be a region of the opening edge 113 far from the opening 112.

In some embodiments, the covering portion 1212 of the support 121 may be pressed against the inner region 1131 of the opening edge 113 near the opening 112. The covering portion 1212 may initially seal the opening edge 113. Since the accommodation body 110 and the support 121 are both hard materials, the connection between the accommodation body 110 and the support 121 and the further covering of the covering portion 1212 cannot achieve a good sealing effect. The covering portion 1212 may be pressed against the opening edge 113. The end away from the opening 112 may be easy to generate a gap between the opening edge 113 and the gap and further penetrates through the cavity 111, thereby reducing the sealability.

In some embodiments, the soft cover layer 122 may cover the outer surface of the covering portion 1212 away from the accommodation body 110, and may further be pressed on the outer region 1132 on the periphery of the inner region 1131 of the opening edge 113. The gap generated between the covering portion 1212 and the opening edge 113 of the support 121 may be further covered. Because the soft cover layer 122 is a soft material, the sealing effect of the electronic component may be improved and the electronic component may be waterproof.

Figure 29:
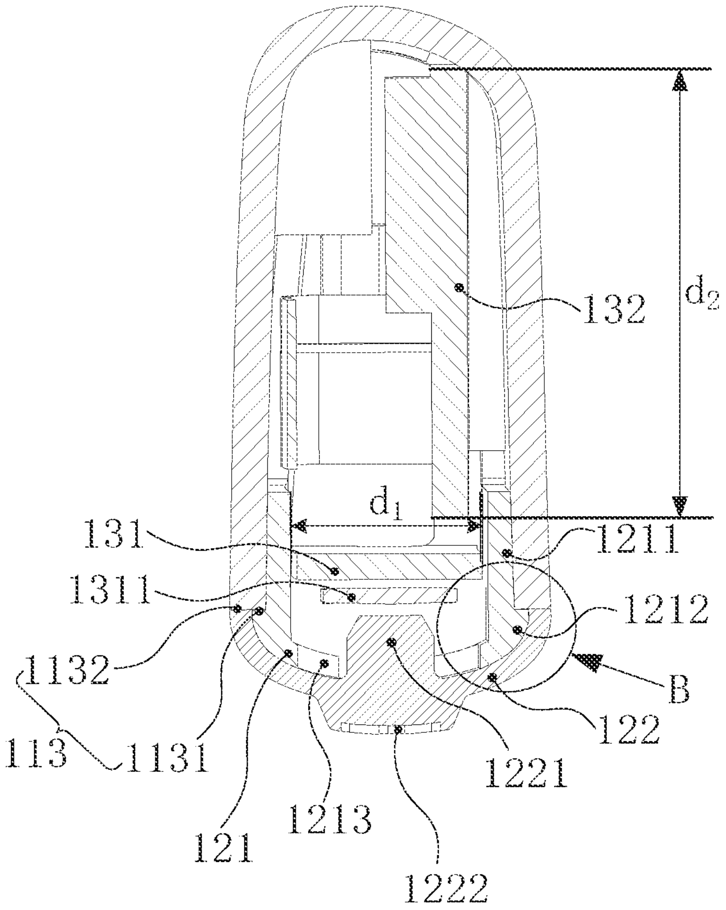
FIG. 29 is a schematic diagram illustrating a cross-sectional view of an electronic component under an assembled state along A-A axis in FIG. 26 according to some embodiments of the present disclosure.
Figure 30:
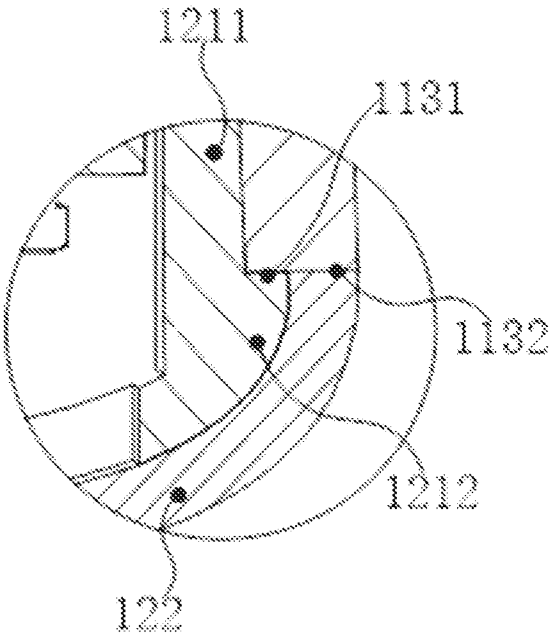
FIG. 30 is a schematic diagram illustrating an enlarged view of part B in FIG. 29 according to some embodiments of the present disclosure.
Figure 33:
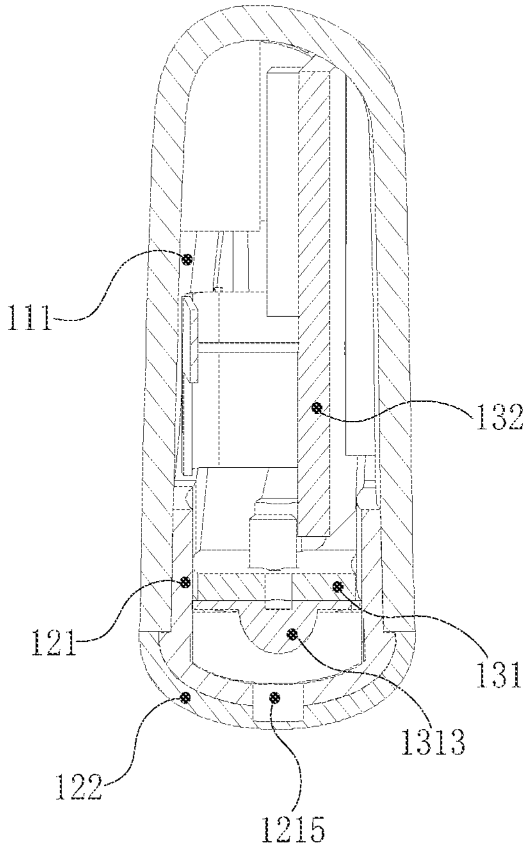
FIG. 33 is a schematic diagram illustrating a cross-sectional view of an electronic component under a combined state along C-C axis in FIG. 26 according to some embodiments of the present disclosure.

FIG. 30 is a schematic diagram illustrating an enlarged view of part B in FIG. 29 according to some embodiments of the present disclosure. As shown in FIG. 33, in some embodiments, when the cover body 120 is fastened, the periphery of the covering portion 1212 may cover the inner region 1131 of the opening edge 113 and may be in contact with the inner region 1131 of the opening edge 113. The soft cover layer 122 may be disposed on a side of the covering portion 1212 away from the accommodation body 110. The covering portion 1212 of the inner region 1131 located inside the opening edge 113 may be sandwiched between the inner region 1131 of the opening edge 113 and the soft cover layer 122. The soft cover layer 122 may further extend along a direction in which the covering portion 1212 is away from the opening 112 and in a direction toward the opening edge 113 until it contacts the outer region 1132 of the opening edge 113. The contact end surface of the covering portion 1212 and the opening edge 113 and the contact end surface of the soft cover layer 122 and the opening edge 113 may be arranged flush with each other. An "opening edge 113-covering portion 1212-covering layer 122" structure may be formed on the inner region 1131 of the opening edge 113.

Figure 31:
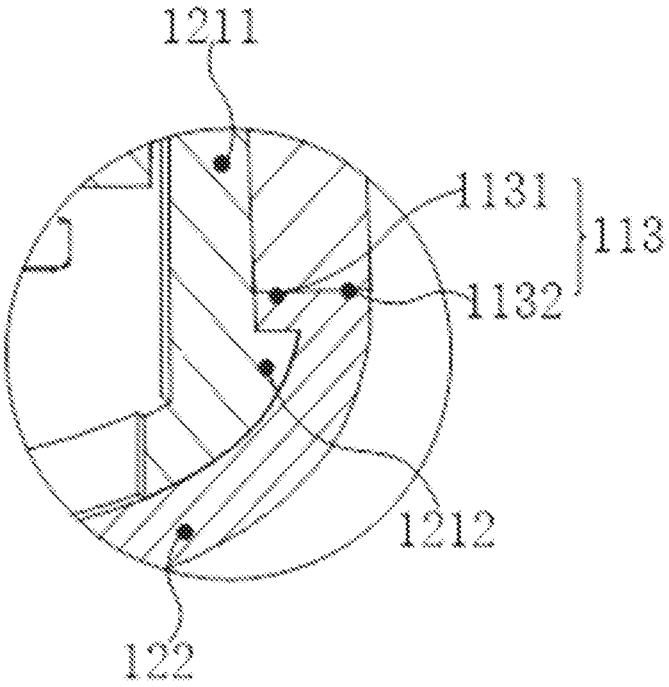
FIG. 31 is a schematic diagram illustrating a partial cross-sectional view of an electronic component according to some embodiments of the present disclosure.

FIG. 31 is a schematic diagram illustrating a partial cross-sectional view of an electronic component in accordance with some embodiments of the present disclosure. As shown in FIG. 31, in some embodiments, after the soft cover layer 122 extends to the outer region 1132 of the opening edge 113 and contact with the outer region 1132, the region between the covering portion 1212 and the opening edge 113 may further be extended to the inner region 1131 of the opening edge 113. The inner region 1131 of the opening edge 113 may be between the covering portion 1212 and the covering portion 1212 and may be pressed on the inner region 1131 of the opening edge 113 to form a structure of "opening edge 113-covering layer 122-covering portion 1212-covering layer 122". In some embodiments, the soft cover layer 122 may further extend between the support 121 and the opening edge 113 on the basis of the covering portion 1212 of the rigid support 121, thereby further improving the seal between the cavity 111 and the cover body 120, and further improving the waterproof effect of the electronic components.

Combining FIG. 26 to FIG. 29, the electronic component may further include a circuit component 130 disposed in the cavity 111. The circuit component 130 may be disposed with a switch 1311. In some embodiments, the circuit component 130 may include a first circuit board 131 disposed on an outer side of the first circuit board 131 facing the opening 112 of the cavity 111. In some embodiments, the circuit components may correspond to the control circuits in FIG. 2.

Correspondingly, the support 121 may be disposed with a switch hole 1213 corresponding to the switch 1311. The soft cover layer 122 may further cover the switch hole 1213. A pressing portion 1221 may be disposed at a position corresponding to the switch hole 1213. The pressing portion 1221 may extend toward the inside of the cavity 111 through the switch hole 1213. When the corresponding position of the soft cover layer 122 is pressed, the pressing portion 1221 may press the switch 1311 on the circuit component 130, thereby triggering the circuit component 13 to execute a preset function.

The pressing portion 1221 disposed on the soft cover layer 122 may be formed by protruding the side of the soft cover layer 122 toward the support 121 toward the switch hole 1213 and the switch 1311. The shape of the pressing portion 1221 may match the switch hole 1213. When the corresponding position of the soft cover layer 122 is pressed, the pressing portion 1221 may pass through the switch hole 1213 to reach the corresponding switch 1311 on the first circuit board 131. At the same time, the length of the pressing portion 1221 in the direction toward the switch 1311 may be determined so that the switch 1311 is not pressed when the position corresponding to the soft cover layer 122 is not pressed, and the corresponding switch 1311 may be pressed when pressed.

In some embodiments, a position on the soft cover layer 122 corresponding to the pressing portion 1221 may further be protruded toward a side facing away from the support 121 to form a convex pressing portion 1222. The user can clear the position of the switch 1311 may be clear for the user. By pressing the corresponding pressing portion 1222, the starting circuit component 130 may be triggered to implement the corresponding functions.

FIG. 32 is a schematic diagram illustrating a cross-sectional view of an electronic component under an assembled state along B-B axis in FIG. 26 according to some embodiments of the present disclosure. As shown in FIG. 32, the electronic component may include a first microphone element 1312. In some embodiments, the first microphone element 1312 may also be disposed on the first circuit board 131 of the circuit assembly 13 to be accommodated in the cavity 111. For example, the first microphone element 1312 may be disposed on the first circuit board 131 at a distance from the switch 1311. The first microphone element 1312 may be used to receive a sound signal from the outside of the electronic component, and convert the sound signal into an electrical signal for analysis and processing.

In some embodiments, a microphone hole 1214 corresponding to the first microphone element 1312 may be disposed on the support 121. A first sounding hole 1223 corresponding to the microphone hole 1214 may be disposed on the soft cover layer 122. A first sound blocking component 1224 may be disposed at a position corresponding to the microphone hole 1214. The first sound blocking component 1224 may extend toward the inside of the cavity 111 through the microphone hole 1214 and define a sounding channel 12241. One end of the sounding channel 12241 may connect with the first sounding hole 1223 on the soft cover layer 122, and the first microphone element 1312 may be inserted into the sounding channel 12241 from the other end of the sounding channel 12241.

In some embodiments, when the electronic component further includes the switch 1311, the switch hole 1213 and the microphone hole 1214 may be disposed on the support 121 at intervals.

In some embodiments, the first sounding hole 1223 may be disposed through the soft cover layer 122 and may correspond to the position of the first microphone element 1312. The first sounding hole 1223 may correspond to the microphone hole 1214 on the support 121, and may further connect with the first microphone element 1312 with the outside of the electronic component. The sound outside the electronic component may be received by the first microphone element 1312 through the first sounding hole 1223 and the microphone hole 1214.

The shape of the first sounding hole 1223 may be any shape, as long as it can input sound from the outside of the electronic component. In some embodiments, the first sounding hole 1223 may be a circular hole having a relatively small size, and may be disposed in a region of the soft cover layer 122 corresponding to the microphone hole 1214. The small first sounding hole 1223 may reduce the connection between the first microphone element 1312 in the electronic component and the outside of the electronic component, thereby improving the sealing of the electronic component.

In some embodiments, the first sound blocking component 1224 may extend from the periphery of the first sounding hole 1223 through the microphone 12212 through the soft cover layer 122 to the inside of the cavity 111 to the periphery of the first microphone element 1312. A sounding channel 12241 from the first sounding hole 1223 to the first microphone element 1312 may be formed. The sound signal of the electronic component entering into the sound guide hole may directly reach the first microphone element 1312 through the sounding channel 12241.

In some embodiments, the shape of the sounding channel 12241 in a cross section perpendicular to the length direction may be the same as or different from the shape of the microphone hole 1214 or the first microphone element 1312. In some embodiments, the cross-sectional shapes of the microphone hole 1214 and the first microphone element 1312 in a direction perpendicular to the support 121 toward the cavity 111 may be square. The size of the microphone hole 1214 may be slightly larger than the periphery size of the sounding channel 12241. The internal size of the sounding channel 12241 may not be less than the periphery size of the first microphone element 1312. The sounding channel 12241 may pass through the first sounding hole 1223 to reach the first microphone element 1312 and be wrapped around the periphery of the first microphone element 1312.

Through the way, the soft cover layer 122 of the electronic component may be disposed with a first sounding hole 1223 and a sounding channel 12241 surrounded by the periphery of the first sounding hole 1223 through the microphone hole 1214 to reach the first microphone element 1312 and wrapped around the periphery of the first microphone element 1312. The sounding channel 12241 may be disposed so that the sound signal entering through the first sounding hole 1223 can reach the first microphone element 1312 through the first sounding hole 1223 and be received by the first microphone element 1312. The leakage of sound signals in the propagation process may be reduced, thereby improving the efficiency of receiving electronic signals by electronic components.

In some embodiments, the electronic component may also include a waterproof mesh cloth 140 disposed in the sounding channel 12241. The waterproof mesh cloth 140 may be held against the side of the soft cover layer 122 facing the microphone element by the first microphone element 1312 and cover the first sounding hole 1223.

In some embodiments, the support 121 in a position close to the first microphone element 1312 in the sounding channel 12241 may be convex to form a convex surface opposite to the first microphone element 1312. The waterproof mesh 140 may be sandwiched between the first microphone element 1312 and the convex surface, or may be directly bonded to the periphery of the first microphone element 1312, and the specific setting manner is not limited here.

In addition to the waterproof effect of the first microphone element 1312, the waterproof mesh fabric 140 may also entrant sound to avoid adversely affecting to the sound receiving effect of the sound receiving area 13121 of the first microphone element 1312.

In some embodiments, the cover body 120 may be arranged in a strip shape. The main axis of the first sounding hole 1223 and the main axis of the sound receiving area 13121 of the first microphone element 1312 may be spaced from each other in the width direction of the cover body 120. The main axis of the sound receiving region 13121 of the first microphone element 1312 may refer to the main axis of the sound receiving region 13121 of the first microphone element 1312 in the width direction of the cover body 120, such as the axis n in FIG. 35. The main axis of the first sounding hole 1223 may be the axis m in FIG. 35.

It should be noted that, the first microphone element 1312 may be disposed at a first position of the first circuit board 131. When the first sounding hole 1223 is provided, the first sounding hole 1223 may be disposed at the second position of the cover body 120 due to the requirements of beauty and convenience. In some embodiments, the first position and the second position may not correspond in the width direction of the cover body 120, so that the main axis of the first sounding hole 1223 and the main axis of the sound receiving area 13121 of the first microphone element 1312 are spaced from each other in the width direction of the cover body 120. The sound input through the first sounding hole 1223 may not be able to reach the sound receiving area 13121 of the first microphone element 1312 in a straight line.

In some embodiments, in order to guide the sound signal entered by the first sounding hole 1223 to the first microphone element 1312, the sounding channel 12241 may be curved.

In some embodiments, the main axis of the first sounding hole 1223 may be disposed in the middle of the cover body 120 in the width direction of the cover body 120.

In some embodiments, the cover body 120 may be part of the outer shell of the electronic device. In order to meet the overall aesthetic requirements of the electronic device, the first sounding hole 1223 may be disposed in the middle of the width direction of the cover body 120. The first sounding hole 1223 may be symmetrical and meets people's visual needs.

In some embodiments, the corresponding sounding channel 12241 may have a step shape along the cross section along B-B axis in FIG. 26. The sound signal introduced by the first sounding hole 1223 may be transmitted to the first microphone element 1312 through the stepped sounding channel 12241 and may be received by the first microphone element 1312.

FIG. 33 is a schematic diagram illustrating a cross-sectional view of an electronic component under a combined state along C-C axis in FIG. 26 according to some embodiments of the present disclosure. In some embodiments, the electronic component may further include a light emitting element 1313. The light emitting element 1313 may be disposed on the first circuit board 131 of the circuit component 130 to be accommodated in the cavity 111. For example, the light emitting element 1313, the switch 1311, and the first microphone element 1312 may be disposed on the first circuit board 131 in a certain arrangement.

In some embodiments, the support 121 may be disposed with a light emitting hole 1215 corresponding to the light emitting element 1313, and the soft cover layer 122 may cover the light emitting hole 1215. The thickness of the region of the soft cover layer 122 corresponding to the light emitting hole 1215 may allow light generated by the light emitting element 1313 to be transmitted through the soft cover layer 122.

In some embodiments, the soft cover layer 122 may still transmit the light emitted from the light emitting element 1313 to the outside of the electronic component under a condition that the soft cover layer 122 covers the light emitting hole 1215 by a certain means.

In some embodiments, the thickness of the entire region or a portion of the region corresponding to the light emitting hole 1215 of the soft cover layer 122 may be less than the thickness of the region corresponding to the periphery of the light emitting hole 1215. The light emitted by the light emitting element 1313 may pass through the light emitting hole 1215 and be transmitted through the soft cover layer 122. The region of the light emitting hole 1215 covered by the soft cover layer 122 may transmit light according to other means.

In some embodiments, the soft cover layer 122 may further be configured to cover the light emitting hole 1215 corresponding to the light emitting element 1313. The light emitted by the light emitting element 1313 may be transmitted from the soft cover layer 122 to the outside of the electronic component. Thus, the light emitting element 1313 may be sealed by the soft cover layer 122 without affecting the light-emitting function of the electronic component. The sealing and waterproof performance of the electronic component may be improved.

It should be noted that the above description of the MP3 player is only for illustration purpose and should not be considered as the only feasible implementation solution. Obviously, for those skilled in the art, after understanding the basic principles of MP3 players, it is possible to make various modifications and changes in the form and details of the specific ways and steps of implementing the MP3 player without departing from this principle, but these modifications and changes are still within the scope described above. For example, the count of the openings 112 may be one or more than one. As another example, in some embodiments, the count of the switches 1311 may be one or more than one. When the count of the switches 1311 is more than one, the switches 1311 may be disposed on the first circuit board 131 at intervals. All such variations are within the protection scope of the present disclosure.

In some embodiments, the loudspeaker apparatus (such as an MP3 player) described above may transmit sound to the user through air conduction. When air is used to transmit sound, the loudspeaker apparatus may include one or more sound sources. The sound source may be located at a specific position of the user's head, for example, the top of the head, forehead, cheeks, cheek horns, auricle, back of auricle, etc., without blocking or covering the ear canal. For the purpose of description, FIG. 34 is a schematic diagram illustrating an exemplary process for transmitting sound through air conduction.

Figure 34:
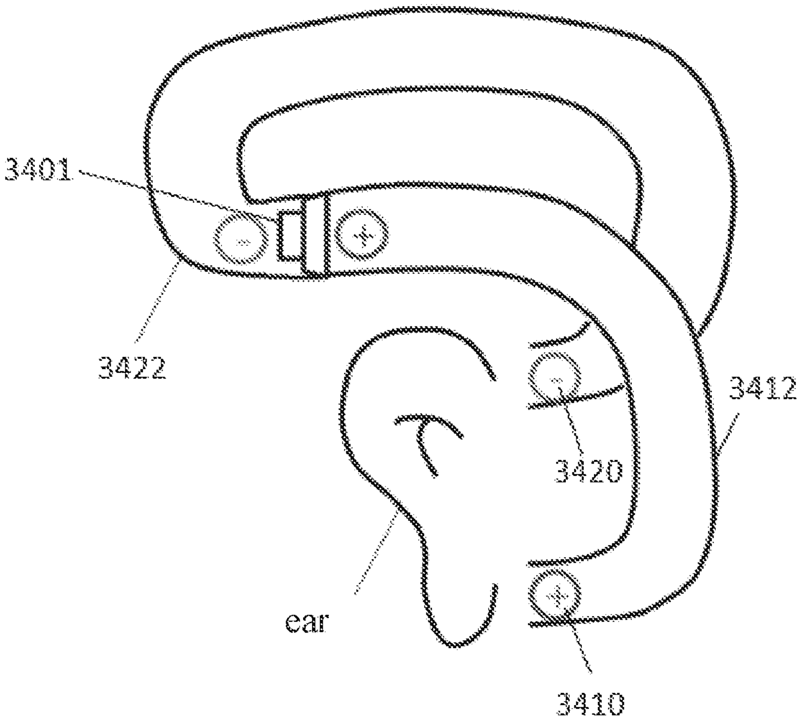
FIG. 34 is a schematic diagram illustrating an exemplary process for transmitting sound through air conduction according to some embodiments of the present disclosure.

As shown in FIG. 34, a sound source 3410 and a sound source 3420 may generate sound waves with opposite phases ("+" and "−" in the figure may indicate opposite phases). For simplicity, the sound source herein may refer to the sound output hole on the loudspeaker apparatus. For example, the sound source 3410 and the sound source 3420 may be two sound outlets respectively located at a specific position on the loudspeaker apparatus (e.g., the housing 20 of the earphone core 50, or the circuit housing 30).

In some embodiments, the sound source 3410 and the sound source 3420 may be generated by the same vibration apparatus 3401. The vibration apparatus 3401 may include a diaphragm (not shown in the figure). When the diaphragm is driven by an electric signal to vibrate, the front side of the diaphragm may drive air to vibrate. The sound source 3410 may be formed at the sound output hole through the sounding channel 3412. The back of the diaphragm drives air to vibrate, and the sound source 3420 may be formed at the sound output hole through the sounding channel 3422. The sound conducting channel may refer to a sound propagation route from the diaphragm to the corresponding sound hole. In some embodiments, the sound guiding channel may be a route surrounded by a specific structure (for example, the housing 20 of the earphone core 50 or the circuit housing 30) on the loudspeaker apparatus. In some embodiments, the sound source 3410 and the sound source 3420 may be generated by different vibration apparatuses. The vibration apparatuses may be generated by different diaphragm vibrations, respectively.

Among the sounds generated by the sound source 3410 and the sound source 3420, a part of the sound may be transmitted to the user's ear to form the sound heard by the user. The other part may be transmitted to the environment to form a sound leakage. Considering that the sound source 3410 and the sound source 3420 are relatively close to the user's ear, the sound transmitted to the user's ear may be referred to as near-field sound, and the leaked sound transmitted to the environment may be referred to as far-field sound. In some embodiments, the near-field/far-field sounds of different frequencies generated by the loudspeaker apparatus may be related to the distance between the sound source 3410 and the sound source 3420. Generally speaking, the near-field sound generated by loudspeaker apparatus may increase as the distance between the two sound sources increases, and the far-field sound (leakage) generated may increase with increasing frequency.

For sounds with different frequencies, the distance between the sound source 3410 and the sound source 3420 may be designed separately. The low-frequency near-field sound (e.g., a sound with a frequency less than 800 Hz) generated by the loudspeaker apparatus may be as large as possible and the high-frequency far-field sound (e.g., a sound with a frequency greater than 2000 Hz) may be as small as possible. In order to achieve the above purpose, the loudspeaker apparatus may include two or more sets of dual sound sources. Each set of dual sound sources may include two sound sources similar to the sound source 3410 and the sound source 3420, and respectively generates sounds of a specific frequency. In some embodiments, the first set of dual sound sources may be used to generate low frequency sounds, and the second set of dual sound sources may be used to generate high frequency sounds. In order to obtain a large low-frequency near-field sound, the distance between two sound sources in the first set of dual sound sources may be set to a larger value. Because the low-frequency signal has a longer wavelength, a larger distance between the two sound sources may not cause an excessive phase difference in the far field, and therefore may not form excessive leakage in the far field. In order to make the high-frequency far-field sound smaller, the distance between two sound sources in the second set of dual sound sources may be smaller. Because the high-frequency signal has a shorter wavelength, a smaller distance between the two sound sources may avoid the formation of a large phase difference in the far field. The formation of large sound leakage may be avoid. The distance between the second group of dual sound sources may be less than the distance between the first group of dual sound sources.

The beneficial effects that the present disclosure may include: (1) The waterproof effect of the loudspeaker apparatus may be improved by sealing various components; (2) The second accommodation space is filled with the sealant, which may fix the wires therein. The influence of the wire vibration on the sound quality may be reduced, and the sound quality of the loudspeaker apparatus may be improved. In addition, the sealant may be filled in the second accommodation space to protect the welding points between the wires. The sealed second accommodation space may be waterproof and dustproof; (3) The housing of the earphone core and the ear hook may be connected through a hinge component, and the fitting position of the housing of the earphone core and the human skin may be adjusted; (4) The soft cover layer and the bracket may be sealed to improve the waterproof performance of the electronic components. It should be noted that different embodiments may have different beneficial effects. In different embodiments, the possible beneficial effects may be any one or a combination of the above, and may be any other beneficial effects that may be obtained.

The basic concepts have been described above. Obviously, to those skilled in the art, the disclosure of the invention is merely by way of example, and does not constitute a limitation on the present disclosure. Although not explicitly stated here, those skilled in the art may make various modifications, improvements and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various parts of this specification are not necessarily all referring to the same embodiment. In addition, some features, structures, or features in the present disclosure of one or more embodiments may be appropriately combined.

In addition, those skilled in the art may understand that various aspects of the present disclosure may be illustrated and described through several patentable categories or situations, including any new and useful processes, machines, products or combinations of materials or any new and useful improvements to them. Accordingly, all aspects of the present disclosure may be performed entirely by hardware, may be performed entirely by software (including firmware, resident software, microcode, etc.), or may be performed by a combination of hardware and software. The above hardware or software may be called "module", "unit", "component" or "system". In addition, aspects of the present disclosure may appear as a computer product located in one or more computer-readable media, the product including computer-readable program code.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, the numbers expressing quantities of ingredients, properties, and so forth, used to describe and claim certain embodiments of the application are to be understood as being modified in some instances by the term "about," "approximate," or "substantially" and etc. Unless otherwise stated, "about," "approximate," or "substantially" may indicate ±20% variation of the value it describes. Accordingly, in some embodiments, the numerical parameters set forth in the description and attached claims are approximations that may vary depending upon the desired properties sought to be obtained by a particular embodiment. In some embodiments, numerical data should take into account the specified significant digits and use a mean reserved for general digits. Notwithstanding that the numerical ranges and parameters configured to illustrate the broad scope of some embodiments of the present disclosure are approximations, the numerical values in specific examples may be as accurate as possible within a practical scope.

At last, it should be understood that the embodiments described in the present application are merely illustrative of the principles of the embodiments of the present application. Other modifications that may be employed may be within the scope of the application. Thus, by way of example, but not of limitation, alternative configurations of the embodiments of the application may be utilized in accordance with the teachings herein. Accordingly, embodiments of the present application are not limited to the embodiments that are expressly introduced and described herein.

What is claimed is:

1. A loudspeaker apparatus, comprising:

an ear hook including an elastic metal wire and a plug end disposed at one end of the elastic metal wire; and a housing of an earphone core configured to accommodate the earphone core, the housing of the earphone core and the plug end being fixed plugged; wherein the plug end includes an insertion portion, the housing of the earphone core is disposed with a socket hole communicating with an outer end surface of the housing of the earphone core, the insertion portion is at least partially inserted into the socket hole, the ear hook further includes a protective sleeve disposed on a periphery of the elastic metal wire and the plug end, an end face of the protective sleeve facing the housing of the earphone core side elastically abuts the outer end surface of the housing of the earphone core when the housing of the earphone core and the plug end are fixed plugged.

2. The loudspeaker apparatus of claim 1, wherein the protective sleeve is injection-molded on the periphery of the elastic metal wire and the plug end.

3. The loudspeaker apparatus of claim 1, wherein the insertion portion includes an exposed portion exposed to the housing of the earphone core, and the exposed portion is a stair-step shape.

4. The loudspeaker apparatus of claim 3, wherein the protective sleeve is sleeved on the exposed portion.

5. The loudspeaker apparatus of claim 3, wherein the protective sleeve is injection-molded and sleeved on the exposed portion.

6. The loudspeaker apparatus of claim 1, wherein the insertion portion includes an exposed portion exposed to the housing of the earphone core.

7. The loudspeaker apparatus of claim 6, wherein the protective sleeve elastically abuts the housing of the earphone core.

8. The loudspeaker apparatus of claim 7, wherein the housing of the earphone core further includes an inclined surface for connecting the outer end surface of the housing of the earphone core and an inner sidewall of the socket hole.

9. The loudspeaker apparatus of claim 1, wherein a stop block is disposed on an inner sidewall of the socket hole; and the plug end includes two elastic hooks that are disposed on a side of the insertion portion facing an interior of the housing of the earphone core, wherein the two elastic hooks are capable of being close to each other under an action of an external thrust and the stop block and being elastically restored to be stuck on an inside surface of the stop block after passing through the stop block.

10. The loudspeaker apparatus of claim 1, further comprising:

a circuit housing configured to accommodate a circuit component or a battery, the circuit housing being connected to the ear hook.

11. The loudspeaker apparatus of claim 10, further comprising:

a housing protector, wherein the housing protector at least partially covers a periphery of the circuit housing and the ear hook.

12. The loudspeaker apparatus of claim 11, wherein the housing protector includes a bag structure with an open end, so that the circuit housing enters an interior of the housing protector through the open end of the housing protector.

13. The loudspeaker apparatus of claim 11, wherein a shape of an inner wall of the housing protector matches a shape of an outer wall of the circuit housing.

14. The loudspeaker apparatus of claim 11, wherein the housing protector is made of a waterproof material.

15. The loudspeaker apparatus of claim 11, wherein the circuit housing comprises two sub-housings fastened to each other, and the housing protector completely covers a joint seam of the two sub-housings.

16. The loudspeaker apparatus of claim 15, wherein a joint surface of the two sub-housings that are fastened to each other comprises a stepped structure that fits into each other.

17. The loudspeaker apparatus of claim 11, wherein the circuit housing is disposed with a plurality of mounting holes, an outer surface of the circuit housing is disposed with a first gum slot, the plurality of mounting holes are located in the first gum slot.

18. The loudspeaker apparatus of claim 17, further comprising conductive pillars respectively inserted into the plurality of mounting holes, wherein the housing protector further includes an exposure hole that allows the conductive pillars to be exposed, and a sealant is applied in the first gum slot to seal the housing protector and the circuit housing at a periphery of the plurality of mounting holes.

19. The loudspeaker apparatus of claim 18, further comprising an auxiliary plate, wherein the auxiliary plate includes a plate body, and the plate body is disposed with a hollowed-out area.

20. The loudspeaker apparatus of claim 19, wherein the plate body is disposed on an inner surface of the circuit housing, the plurality of mounting holes are located inside the hollow-out area, a second gum slot is formed on a periphery of the conductive pillar, and a sealant is applied in the second gum slot to seal the plurality of mounting holes inside the circuit housing.

* * * * *